(12) United States Patent  (10) Patent No.: US 7,672,779 B2
Fuchs  (45) Date of Patent: Mar. 2, 2010

(54) SYSTEM AND METHOD FOR USING UNIVERSAL LOCATION REFERENCING OBJECTS TO PROVIDE GEOGRAPHIC ITEM INFORMATION

(75) Inventor: Gil Fuchs, Woodside, CA (US)

(73) Assignee: Tele Atlas North America Inc., Lebanon, NH (US)

( * ) Notice: Subject to any disclaimer, the term of this patent is extended or adjusted under 35 U.S.C. 154(b) by 0 days.

(21) Appl. No.: 11/927,569

(22) Filed: Oct. 29, 2007

(65) Prior Publication Data
US 2008/0162467 A1 Jul. 3, 2008

Related U.S. Application Data

(63) Continuation of application No. 11/271,436, filed on Nov. 10, 2005, now Pat. No. 7,532,979.

(51) Int. Cl.
G01C 21/30 (2006.01)
(52) U.S. Cl. ............... 701/209; 707/103 R; 707/101; 707/103 Y; 707/104.1; 701/208
(58) Field of Classification Search ......... 701/208–209; 707/103 R, 103 Y, 101, 104.1; 715/855; 709/208
See application file for complete search history.

(56) References Cited

U.S. PATENT DOCUMENTS

| 5,648,768 | A |   | 7/1997  | Bouve         |
|-----------|---|---|---------|---------------|
| 5,682,525 | A |   | 10/1997 | Bouve et al.  |
| 5,764,745 | A |   | 6/1998  | Chan et al.   |
| 5,839,088 | A |   | 11/1998 | Hancock       |
| 6,047,236 | A |   | 4/2000  | Hancock       |
| 6,154,738 | A | * | 11/2000 | Call ............... 707/4 |
| 6,202,023 | B1|   | 3/2001  | Hancock       |
| 6,223,122 | B1|   | 4/2001  | Hancock       |
| 6,295,502 | B1|   | 9/2001  | Hancock       |
| 6,339,744 | B1|   | 1/2002  | Hancock et al.|
| 6,343,317 | B1|   | 1/2002  | Glorikian     |
| 6,356,834 | B2|   | 3/2002  | Hancock       |

(Continued)

OTHER PUBLICATIONS

Sequence-Based Localization in Wireless Sensor Networks; Yedavalli, K.; Krishnamachari, B.; Mobile Computing, IEEE Transactions on; vol. 7, Issue 1, Jan. 2008 pp. 81-94; Digital Object Identifier 10.1109/TMC.2008.4387797.*

(Continued)

Primary Examiner—Cuong H Nguyen

(57) ABSTRACT

A method and system for creating and/or using a universal location referencing object (ULRO) with electronic files including electronic maps. ULROs establish traversable links between a file-of-reference and third-party-files. In accordance with an embodiment, the ULRO comprises a universal location referencing code uniquely corresponding to the location, together with several optional components, including: a set of name information; a super-set of coordinates; a file-of-reference pointer field comprising a file-of-reference pointer; a third-party-file pointer field comprising one or more third-party-file pointers; a file-of-reference back-pointer field comprising a file-of-reference back-pointer; a third-party-file back-pointer field comprising one or more third-party-file back-pointers; and a metadata field. ULROs allow recognition of equivalence of features in different maps, and facilitate dynamic combination or linking of multiple maps into one virtual map, with traversable connectivity for a wide variety of map formats.

11 Claims, 11 Drawing Sheets

U.S. PATENT DOCUMENTS

| | | |
|---|---|---|
| 6,385,622 B2 | 5/2002 | Bouve et al. |
| 6,408,307 B1 | 6/2002 | Semple |
| 6,415,291 B2 | 7/2002 | Bouve et al. |
| 6,418,441 B1* | 7/2002 | Call ............................ 707/10 |
| 6,473,692 B2 | 10/2002 | Hancock et al. |
| 6,597,983 B2 | 7/2003 | Hancock |
| 6,609,062 B2 | 8/2003 | Hancock |
| 6,611,751 B2 | 8/2003 | Warren |
| 6,636,242 B2* | 10/2003 | Bowman-Amuah ......... 715/764 |
| 6,674,445 B1* | 1/2004 | Chithambaram et al. .... 345/619 |
| 6,772,213 B2 | 8/2004 | Glorikian |
| 6,934,906 B1 | 8/2005 | Cheok |
| 6,957,231 B1* | 10/2005 | Lubbers et al. .......... 707/104.1 |
| 7,062,705 B1* | 6/2006 | Kirkwood et al. ........... 715/205 |
| 7,069,518 B2* | 6/2006 | Card et al. .................. 715/776 |
| 7,114,148 B2* | 9/2006 | Irving et al. ................ 717/121 |
| 7,133,031 B2* | 11/2006 | Wang et al. .................. 345/173 |
| 7,158,878 B2 | 1/2007 | Rasmussen et al. |
| 7,233,851 B2* | 6/2007 | Iwazaki et al. ................ 701/41 |
| 7,240,296 B1* | 7/2007 | Matthews et al. ........... 715/840 |
| 7,379,811 B2 | 5/2008 | Rasmussen et al. |
| 7,421,275 B1 | 9/2008 | Hancock |
| 7,461,330 B1 | 12/2008 | Cheok |
| 2001/0021930 A1 | 9/2001 | Bouve et al. |
| 2001/0029426 A1 | 10/2001 | Hancock |
| 2001/0054036 A1 | 12/2001 | Bouve et al. |
| 2002/0019827 A1* | 2/2002 | Shiman et al. .............. 707/200 |
| 2002/0032674 A1 | 3/2002 | Semple |
| 2002/0046259 A1 | 4/2002 | Glorikian |
| 2002/0087260 A1 | 7/2002 | Hancock |
| 2002/0112003 A1 | 8/2002 | Glorikian |
| 2002/0167442 A1 | 11/2002 | Taylor |
| 2002/0169541 A1 | 11/2002 | Bouve et al. |
| 2003/0033176 A1 | 2/2003 | Hancock |
| 2003/0036842 A1 | 2/2003 | Hancock |
| 2003/0058277 A1* | 3/2003 | Bowman-Amuah ......... 345/765 |
| 2003/0074136 A1 | 4/2003 | Hancock |
| 2004/0030493 A1 | 2/2004 | Pechatnikov et al. |
| 2004/0036649 A1 | 2/2004 | Taylor |
| 2004/0064830 A1* | 4/2004 | Irving et al. ................ 719/328 |
| 2004/0119759 A1 | 6/2004 | Barros |
| 2004/0128065 A1 | 7/2004 | Taylor et al. |
| 2004/0139049 A1 | 7/2004 | Hancock et al. |
| 2004/0249686 A1 | 12/2004 | Murphy |
| 2005/0003797 A1 | 1/2005 | Baldwin |
| 2005/0033511 A1 | 2/2005 | Pechatnikov et al. |
| 2005/0210412 A1* | 9/2005 | Matthews et al. ........... 715/835 |
| 2005/0278371 A1 | 12/2005 | Funk et al. |
| 2005/0282556 A1 | 12/2005 | Morris |
| 2005/0283503 A1 | 12/2005 | Hancock |
| 2006/0015397 A1 | 1/2006 | Vitrano et al. |
| 2006/0026032 A1 | 2/2006 | Higgins et al. |
| 2006/0075442 A1 | 4/2006 | Meadow |
| 2006/0284767 A1 | 12/2006 | Taylor |
| 2007/0001875 A1 | 1/2007 | Taylor |
| 2007/0083539 A1 | 4/2007 | Glorikian |
| 2007/0136663 A1* | 6/2007 | Grigoriadis et al. ......... 715/530 |
| 2008/0024360 A1 | 1/2008 | Taylor |
| 2008/0024364 A1 | 1/2008 | Taylor |
| 2008/0028312 A1* | 1/2008 | Alvarez et al. .............. 715/719 |
| 2008/0109757 A1* | 5/2008 | Stambaugh ................. 715/835 |
| 2008/0201299 A1* | 8/2008 | Lehikoinen et al. ............ 707/3 |

OTHER PUBLICATIONS

Scaling Location-based Services with Dynamically Composed Location Index; Bamba, Bhuvan; Seshadri, Sangeetha; Liu, Ling; Services Computing, 2008. SCC '08. IEEE International Conference on; vol. 1, Jul. 7-11, 2008 pp. 453-460 Digital Object Identifier 10.1109/SCC.2008.114.*

A Study of Motion Detection System Based on Coordinate Orientation; Lin, Y.H.; Huang, Y.S.; Young, M.S.; Bioinformatics and Biomedical Engineering, 2008. ICBBE 2008. The 2nd International Conference on; May 16-18, 2008 pp. 909-910; Digital Object Identifier 10.1109/ICBBE.2008.223.*

Automated Refactoring of Legacy Java Software to Enumerated Types; Khatchadourian, R.; Sawin, J.; Rountev, A.; Software Maintenance, 2007. ICSM 2007. IEEE International Conference on; Oct. 2-5, 2007 pp. 224-233; Digital Object Identifier 10.1109/ICSM.2007.4362635.*

General-purpose operating systems, such as Linux; Zhao, Qin; Rabbah, Rodric; Amarasinghe, Saman; Rudolph, Larry; Wong, Weng-Fai; Code Generation and Optimization, 2007. CGO '07. International Symposium on; Mar. 2007 pp. 299-311 Digital Object Identifier 10.1109/CGO.2007.12.*

General-purpose operating systems, such as Linux; Zhao, Qin; Rabbah, Rodric; Amarasinghe, Saman; Rudolph, Larry; Wong, Weng-Fai; Code Generation and Optimization, 2007. CGO '07. International Symposium on; Mar. 2007 pp. 299-311 Digital Object Identifier 10.1109/CGO.2007.12.*

Extracting area objects from raster image data; Riekert, W.-F.; Computer Graphics and Applications, IEEE; vol. 13, Issue 2, Mar. 1993 pp. 68-73; Digital Object Identifier 10.1109/38.204969.*

Network Control for Multibeam TDMA and SS/TDMA; Campanella, S.; Colby, R.; Selected Areas in Communications, IEEE Journal on; vol. 1, Issue 1, Jan. 1983 pp. 174-187.*

International Search Report for PCT/US06/43505, dated Apr. 8, 2008, 7 pages.

International Search Report in re: PCT/US06/43505, dated Jun. 17, 2008, 12 pages.

International Search Report in re PCT/US07/68049, dated Feb. 27, 2008, 6 pages.

OpenStreetMap, GDF, http://wiki.openstreetmap.org/index.php/GDF, Jan. 24, 2008, 5 pages.

Safespot, Safeprobe—InVehicle Sensing and Platform, http://www.safespot-eu.org/page.php, Feb. 18, 2008, 2 pages.

Wikipedia, Keyhole Markup Language, http://en.wikipedia.org/wiki/Keyhole_Markup_Language, Feb. 18, 2008, 3 pages.

Wikipedia, Geographic Data Files, http://en.wikipedia.org/wiki/Geographic_Data_Files, Feb. 18, 2008, 2 pages.

Verifying Safety Policies With Size Properties and Alias Conrols: Wei-Ngan Chin; Siau-Cheng Khoo, Shengchao Qin; Corneliu Popeea; Huu Hai Nguyen; Software Engineering, 2005, ICSE 2005, Proceedings, 27th International Conference on May 15-21, 2005, pp. 186-195; Digital Object Identified 10.1109/ICSE.2005.1553561.

A SHARd Web to Support Design Teams; Kumar, V.; Glicksman, J.; Kramer, G.A.; Enabling Tecnologies; Infrastructure for Collaborative Enterprise, 1994, Proceedings, Third Workshop on Apr. 17-19, 1994 pp. 178-182; Digital Object Identifier 10. 1109/ENABL.1994.330512.

* cited by examiner

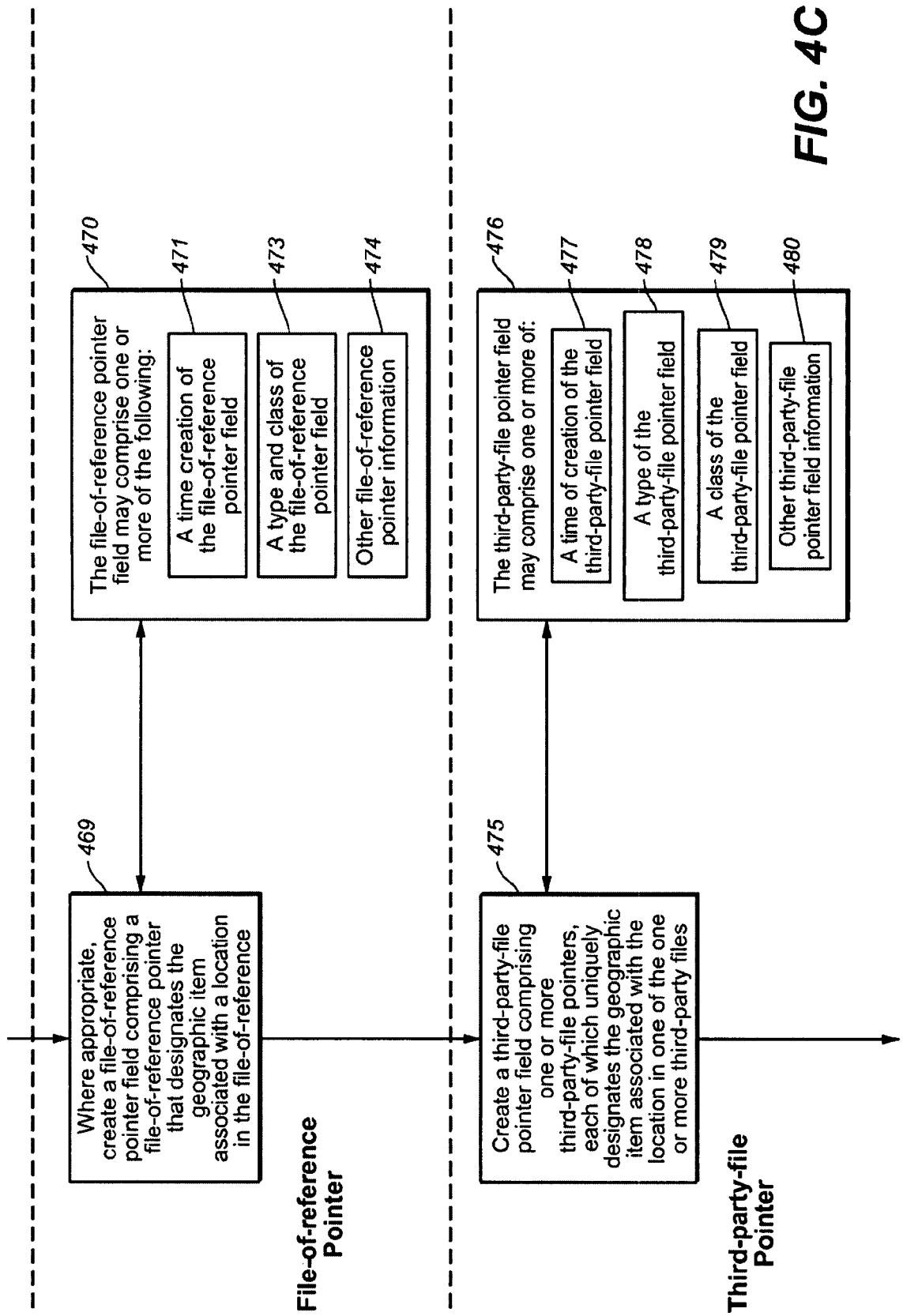

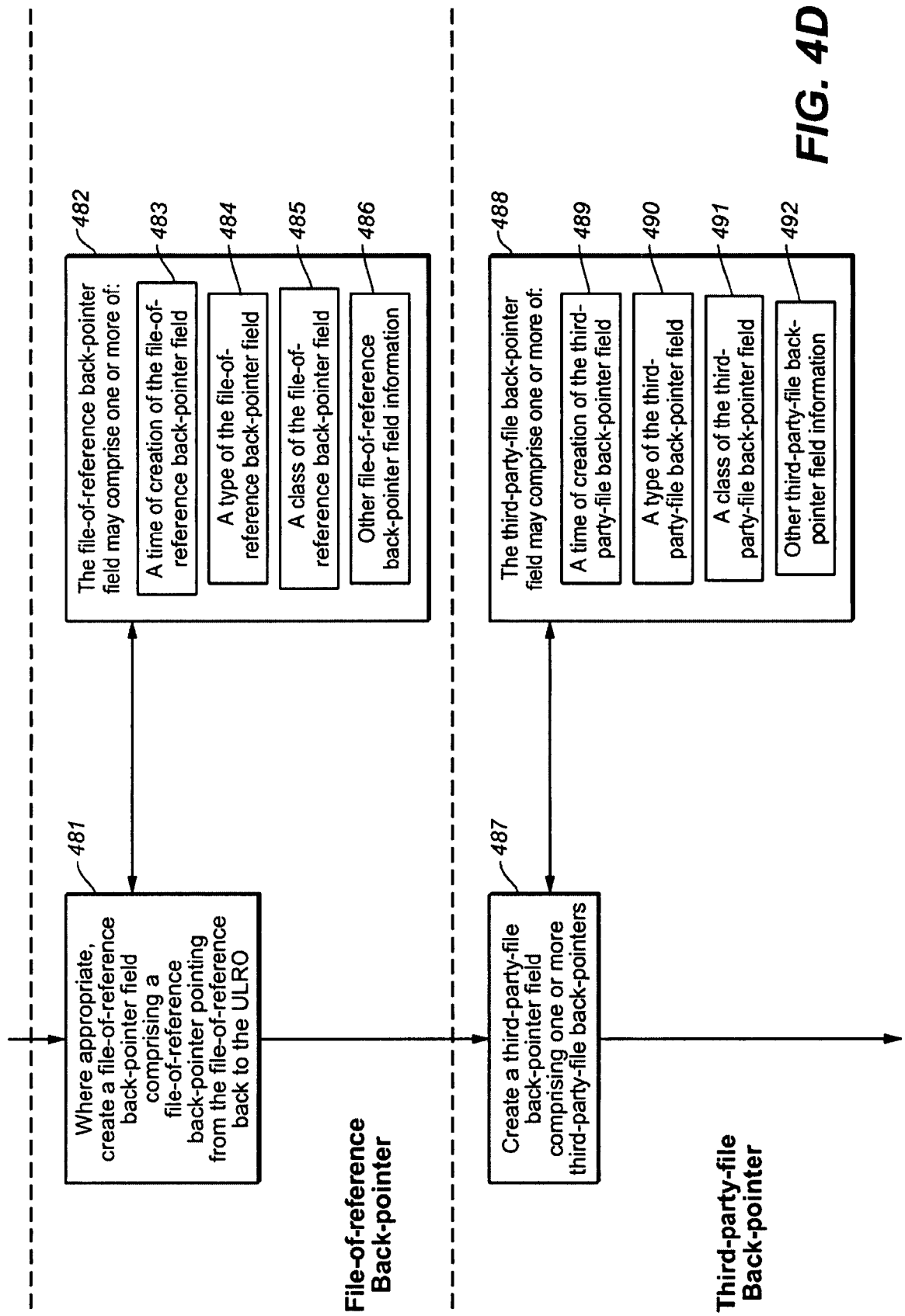

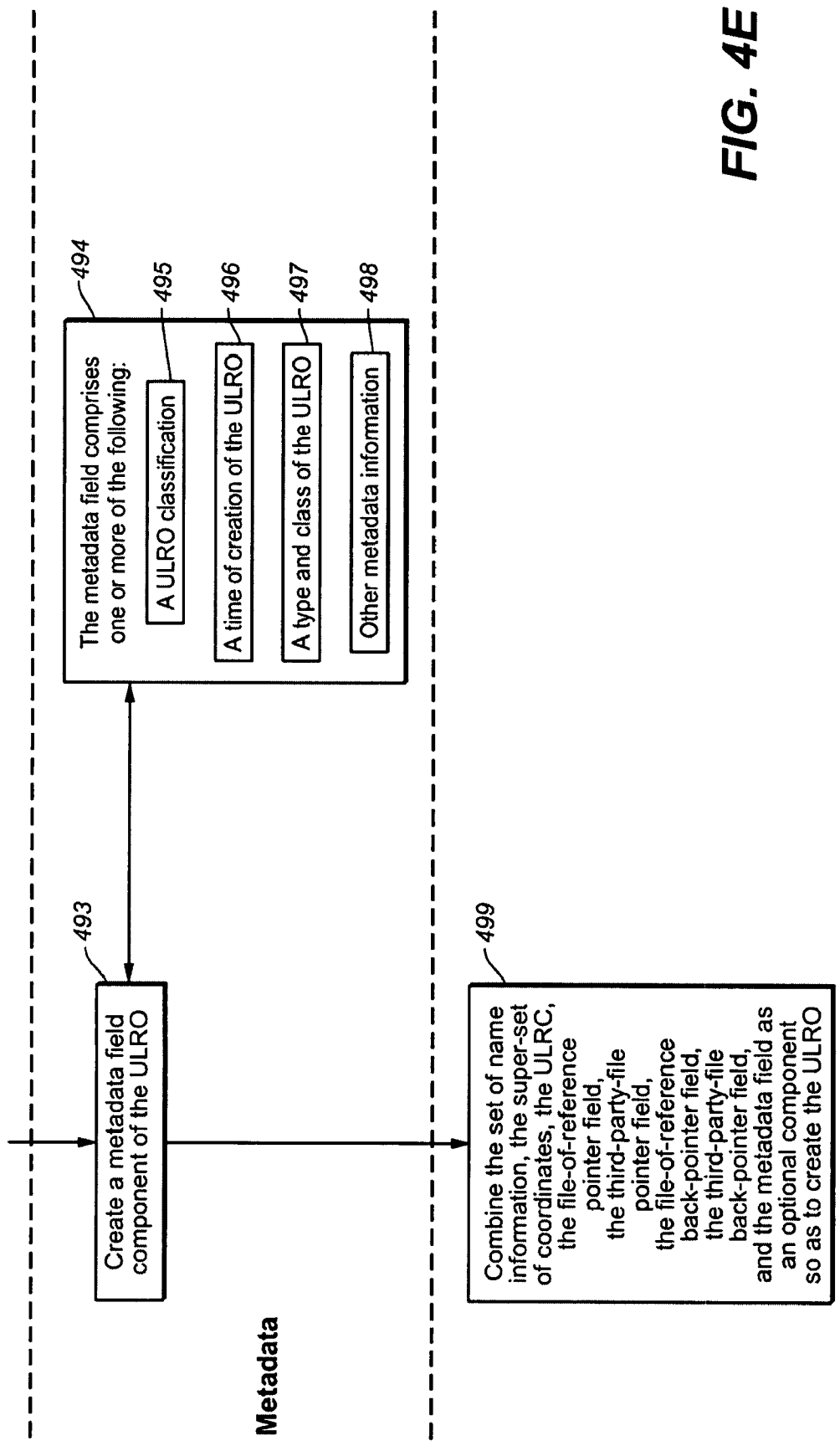

SYSTEM AND METHOD FOR USING UNIVERSAL LOCATION REFERENCING OBJECTS TO PROVIDE GEOGRAPHIC ITEM INFORMATION

CLAIM OF PRIORITY

This application is a continuation of pending U.S. patent application Ser. No. 11/271,436 entitled "METHOD AND SYSTEM FOR CREATING UNIVERSAL LOCATION REFERENCING OBJECTS" by Gil Fuchs, filed Nov. 10, 2005.

CROSS-REFERENCE TO RELATED APPLICATIONS

This application is related to provisional U.S. Patent Application No. 60/797,130 entitled "SYSTEM AND METHOD FOR PROVIDING A VIRTUAL DATABASE ENVIRONMENT AND GENERATING DIGITAL MAP INFORMATION," Inventors: Gil Fuchs, Ettie Ettinger, Allen Brown, and Eric Crowe, filed May 2, 2006, now abandoned; and Pending U.S. patent application Ser. No. 11/742,937 entitled "SYSTEM AND METHOD FOR PROVIDING A VIRTUAL DATABASE ENVIRONMENT AND GENERATING DIGITAL MAP INFORMATION," inventors Gil Fuchs, et al., filed May 1, 2007, and incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The invention is related to electronic maps, electronic documents, and electronic databases, and, specifically, to a method and system for creating universal location referencing objects for use in such electronic maps, documents, and databases

BACKGROUND

Historically, documents were printed on paper or other non-modifiable, non-interactive media, and did not allow any user modification of the information, or, for example, of relationships between data points. Moreover, documents could not be updated when new information appeared, and the concept of "databases" in the modern sense of this word did not even exist, rendering the concept of updating them moot.

Prior to the computer age, there were essentially two forms of recourse whenever a map needed modification: 1) to enter a correction by hand on the paper copy or copies of the map; or 2) to reprint the map with the correction made on the original. Manual corrections are time-intensive; particularly for multiple modifications, and by definition do not update any of the other remaining copies of the map. The second option of reprinting the map is expensive, and is also an impractical way to respond to frequent modifications.

In the current age, paper maps have been largely superceded by databases, documents, and maps in digital, electronic formats, capable of being updated as desired and able to respond to a selected range and type of operator input and to produce operator-requested output. Many electronic documents and electronic databases in common usage today comprise information related to geographic location(s). Indeed, it is not easy to think of a class of electronic documents or a class of electronic databases that does not at least occasionally incorporate some form of geographically related information.

Examples of electronic databases that is relevant to certain embodiments of the present invention are "geospatial databases", commonly referred to as "electronic maps" or "digital maps". Today, maps have evolved well beyond their centuries-old status as static paper depictions of a non-adjustable data set as recorded at one particular time. For simplicity, much of the discussion below refers to electronic maps, although the points made also apply to electronic documents and electronic databases, other than maps, that contain geographic information.

One of the benefits of a digital map over a traditional paper-based map is its inherent flexibility and its ability to portray large amounts of data. Paper maps are necessarily limited in the amount and type of information they can portray, within the constraints of their physical formats. Paper maps are also difficult to update.

Digital maps do not suffer from these problems. While earlier digital maps may have seemed merely like a scanned version of the paper product, today's modern digital maps are much more powerful. Information can be included in the map and either displayed, or not displayed, depending on the wishes of the operator.

Today's digital maps, also known as electronic maps, can allow for regular modification of data points included in the map, in addition to active operator selection of desired geographic features of interest. As new information arises, of a type specifically relevant to a map of interest, the whole map can be quickly updated to reflect changes or corrections to all or just a small subset of locations.

Digital maps may be capable of responding to certain types of operator input and may be capable of offering a range of operator-adjustable output. Current electronic maps may offer the operator the option to select the scale at which the map is viewed. Often this is done using a "zoom-in" and/or "zoom-out" capability. This feature, while important and useful, does not actually change the content contained in a particular map, but rather re-presents the map at a different level of detail and with a different geographic focus.

A typical application of electronic maps is in the travel industry, whereby digital maps are used to quickly and automatically chart travel routes and to locate destinations. Digital maps have found a particularly common everyday use in automobiles, wherein Global Positioning Systems (GPS) and other position determination devices are used in association with a digital map to automatically track the position of a car and display the position on a map, for example, to guide the driver to a particular destination.

Digital maps are often also used in commercial environments, for example, in calculating optimized routes for delivery drivers to take when performing deliveries, or for providing accurate directions for emergency and medical crews to follow when responding to emergency calls. For many years, the electronic map industry has also supplied maps to the military for use in military applications. Digital maps find a use in all aspects of industry, including for ground-based, maritime, and aviation purposes. As people have become more familiar with portable, handheld electronic devices such as Personal Digital Assistants (PDA's) and smart phones, which are increasingly distributed together with electronic maps stored therein, the electronic or digital map industry has grown to infiltrate virtually every aspect of society.

Some currently available digital maps allow for linking between a text address and its location on the map. If, for example, an operator inputs a street address into the Yahoo! Maps software application, MapQuest, or a similar Internet mapping website, the output indicates the location of that particular address on a map that is drawn of the surrounding area. Essentially a map of the region encompassing the address of interest is constructed around the selected point. The map may contain overlays of useful information. For example, a street map of San Francisco may be overlaid with a map of the railroad system in San Francisco and that map in turn overlaid by icons representing San Francisco restaurants and parking facilities.

However, these various overlays are "map-level overlays", meaning that they are registered one to another on the basis of their coordinates. No interactivity is typically available between different points in the overlay or between a point in one overlay and a point in another overlay. While such a coordinate overlay may result in something that appears to an end-user like a single map, it cannot dynamically function like one fully integrated, intelligent digital map. In a sense, the entities in one layer know nothing about the entities in any other layer and hence cannot support further data processing related to useful linkages between those entities. Moreover, such an overlay map is only possible if it is permitted by the scales, formats and coordinate systems of the different maps and different spatial data files. Such an overlay map is not feasible if the information in one or more documents is not presented in the form of a map.

For example, the restaurant information may take the form of a text list of restaurant names and addresses. In this case, using traditional methods there is no easy way to seamlessly integrate the restaurant data with the railroad and street data of our example. Solutions in the past simply found the coordinates of the restaurant by finding its address located within the street map and generating a set of icons to display as an overlay. While this allowed for a simple address linkage it was incapable of any more sophisticated linkages.

Alternatively, a richer set of linkages could be made possible, but only if all information has been comprised within the same single integrated map file. This puts the increasingly untenable burden on a single map vendor to integrate the entire body of spatial knowledge into a single electronic map. However, in most situations, the map vendor doesn't even have access to all the necessary information, so despite their best intentions, it is increasingly difficult to create a completely integrated map.

Finally, in accordance with traditional methods, any changes in the placement of an entity on one layer cannot automatically be coordinated with entities in other layers, thereby requiring much extra work in keeping all of the layers integrated.

With the progression of the Internet and generally, the information age, increasingly more data with spatial components is becoming available, that could be linked together in an integrated intelligent electronic map. It is a shortcoming of the traditional methods that the layered approach will not handle such intelligent linkages, and hence will limit the ability to query the full richness of the spatial content becoming available. Also, because of the intensive labor in keeping the coordinate-related data synchronized, the traditional techniques limit the overall amount of data that can be maintained and updated. Moreover, given the explosion of spatially related information that is digitally available and of interest to map users it is neither economically nor logistically feasible for map-related enterprises to create and maintain the entire universe of such information. It is these, and other limitations of the prior art that the present invention is designed to address.

SUMMARY

Generally described, the invention presents a method and system for creating universal location referencing objects (ULROs) for use in conjunction with electronic documents, electronic databases, and electronic maps, which are collectively referred to herein as "electronic spatial data files". Virtually everything stated herein regarding one type of electronic spatial data file can also be applied to another type of electronic spatial data file with no loss of applicability. A single logical spatial data file may be partitioned. One logical electronic spatial data file may thus comprise one or more physical files, which may or may not have geographic definitions.

To address the limitations described above with respect to traditional methods, it is desirable to devise a system for creating "virtual maps". A virtual map is defined herein as a digital map capable of dynamically connecting information contained in one or more databases, and presenting it to an operator seamlessly and in real time. Typically, modern electronic maps are not able to link points of interest in one electronic map or database with points of interest in a second electronic map or another database to create a virtual map with relationships between the objects in one map and the objects in the second map or database.

It is an objective of the present invention to create a ULRO object that captures the salient information of a location; comprising geographic location, a name associated with that location and a permanent identifier for that location.

It is a further objective of the present invention to create ULROs to enable linking the items of a database that can be spatially defined, or data related to such items, to a map database and thereby enabling a Virtual Database (VDB) to offer a user access to a seamless electronic database with a greater richness of dynamically linked content.

It is a further objective of the present invention to create ULROs to enable the linking of items of a database that can be spatially defined, or data related to such items, to a map database and thereby enabling a user to select all desired content to be compiled and packaged or stored on media, such as a CD or DVD, for use in off-line products such as a embedded navigation system.

It is a further objective of the present invention to build a ULRO structure that facilitates the initial registration or linking of a vast amount of distributed data, even those with different formats, and, once linked with both forward and reverse pointers, facilitating the fast and efficient generation of intelligent maps, customized with the appropriate information to meet the user's request.

It is a further objective of the present invention to minimize the storage space needed to store the many relationships, grouping geographic items of the same location, reducing such space requirements from typically a size proportional to N! (N factorial, where N is the number of distributed links containing pertinent information), to a factor proportional to N, and to similarly improve upon the speed of searching, reducing it from something proportional to $N^2$ (N-squared) to something proportional to a constant value, C.

It is a further objective of the present invention to enable independent maintenance of the map and of the third party databases, thereby reducing the effort needed in keeping current the content of these large databases.

It is a further objective of the present invention to increases the speed and efficiency by which information can be retrieved from otherwise independent or third-party sources, and compiled in a dynamic fashion so that it can be easily updated and searched, as new information becomes available.

It is a further objective of the present invention to enable a hierarchical construction of ULROs, and to provide a means by which they can relate to one another in a uniform way.

As described herein, an embodiment of a ULRO comprises a permanent identification code designed to identify a selected location. A location in turn may be associated with one or more geographic items. ULROs can be employed to establish traversable links or connections between a file-of-reference and third-party-files for a broad range of database formats. A file-of-reference is a geospatial file used for permanent storage of a file owner's geographic data. A third-party-file is a geospatial file used for permanent storage of a third party's geographic data. Whatever its format may happen to be, a file-of-reference or a third-party-file can typically be transformed into other formats that may be more appropriate for certain applications. In accordance with various embodiments of the present invention, this technique can be used to establish traversable links between a map-of-reference and one or more of third-party maps and third-party-spatial data files.

As further described herein, in accordance with an embodiment a ULRO points to geographic items associated with a common location and located in two or more different files. Often but not always, one of the files is the database-of-reference. Effectively, a traversable link is thereby created between the two files. ULROs substantially reduce the number of connections required to create traversable links between each of a set N of documents. Using a traditional approach, each document would be required to point to each other document, and each document would then in turn be pointed-at by each other document, for a total number of pointers on the order of N! (N factorial). The present invention makes possible a star configuration, which reduces the total number of pointers required, to a number in the order of 2 times N. For a large number of documents, i.e. for a large value of N, this lowers the number of connections by several orders of magnitude. Furthermore, since (a) the total number of connections is much smaller; and (b) the ULRO technique eliminates the need to perform multi-discovery over many files in favor of a direct, pointered access to those files; the resultant ability to retrieve related map data is much faster using a ULRO than with traditional approaches.

As further described herein, in accordance with an embodiment a ULRO corresponds to a selected geographic item associated with a location. In accordance with one embodiment, a ULRO comprises eight principal components, some or all of which may be utilized depending on the particular implementation: 1) a set of name information; 2) a super-set of coordinates; 3) a universal location referencing code (ULRC) uniquely corresponding to the location; 4) a file-of-reference pointer field comprising a file-of-reference pointer; 5) a third-party-file pointer field comprising one or more third-party-file pointers; 6) a file-of-reference back-pointer field comprising a file-of-reference back-pointer; 7) a third-party-file back-pointer field comprising one or more third-party-file back-pointers; and 8) a metadata field.

In accordance with an embodiment, the file-of-reference pointer field and the third-party-file pointer field are each contained within the ULRO. Both of the back-pointer fields are contained within their respective files. The file-of-reference, third-party-file and ULROs can be located remotely from each other. The eighth component is a metadata field comprising metadata related to the ULRO. In accordance with an embodiment, the only mandatory field in the ULRO is the ULRC. It is also mandatory that the set of name information and the set of coordinates not both be blank, although either one or the other can be blank for a particular ULRO.

Using the above example of map containing restaurant information, and text entries, using the ULRO approach additional attributes can be integrated and presented to a user regardless of whether the information is contained in the form of a map or in another form. For example, if the restaurant information is a text listing of restaurant names, it can be combined with the railroad and street maps to create a virtual map as easily and effectively as if the restaurant information was in map format. Through the use of ULROs, it is easier for operators of end-user applications to obtain spatially relevant data from virtual maps. Virtual maps are capable of using the present invention to usefully and accessibly combine the information in a file-of-reference with information comprised in one or more of a variety of third party sources. For example, the ULRO techniques may also be used together with a virtual map database technique, described in further detail in co-pending application Ser. No. 11/742,937 entitled "SYSTEM AND METHOD FOR PROVIDING A VIRTUAL DATABASE ENVIRONMENT AND GENERATING DIGITAL MAP INFORMATION," inventors Gil Fuchs, et al., filed May 1, 2007, and incorporated herein by reference, to create virtual maps in a dynamic, run-time fashion. In such a system, the user can, for example, obtain answers to such questions as: "Show me Italian restaurants near the Geary Theater, and for each restaurant, show me the parking garages that will validate parking".

These and other objectives, advantages, and benefits of the present invention will be evident from the accompanying detailed description and drawings.

DETAILED DESCRIPTION

Figure 1:
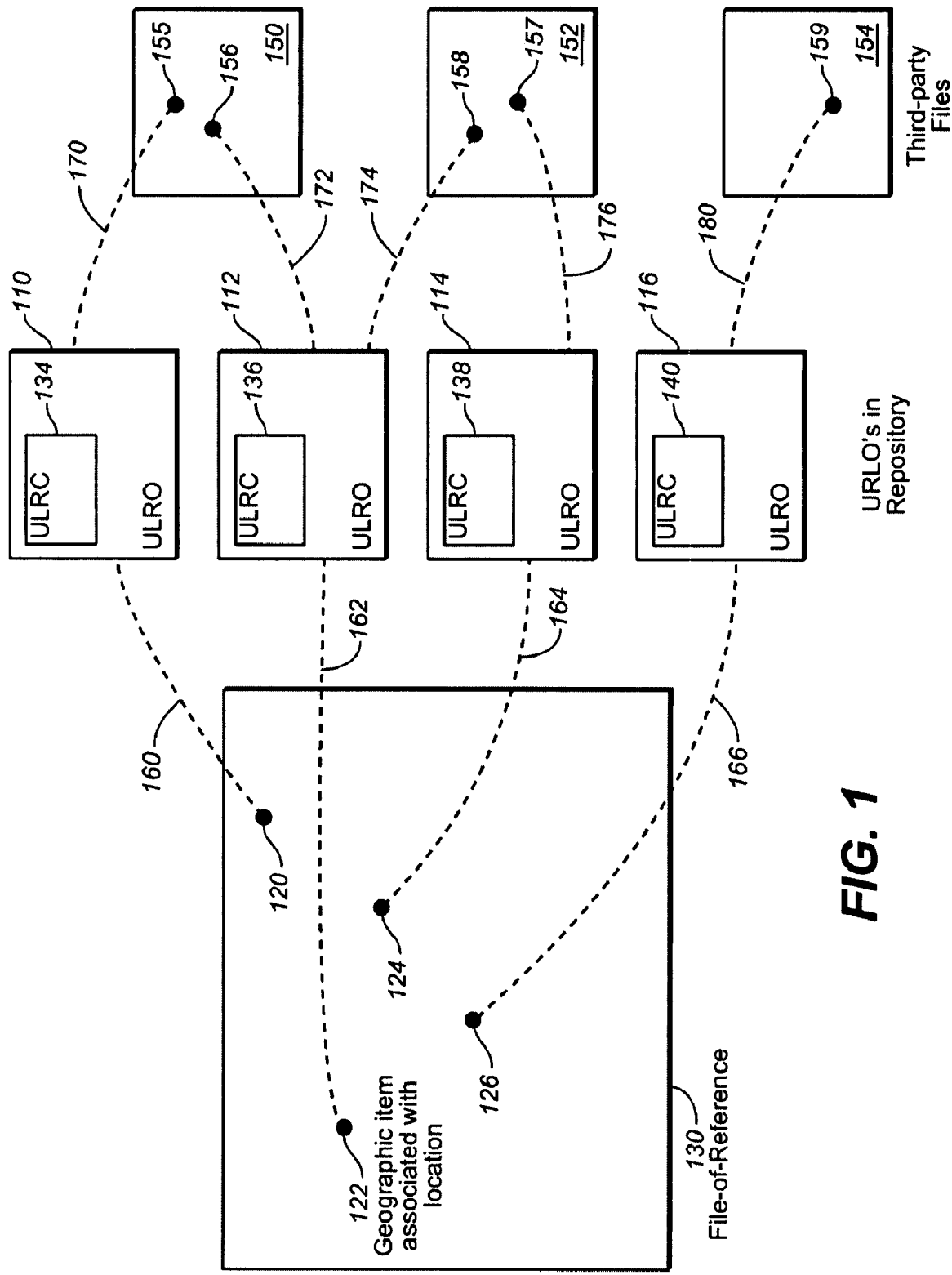
FIG. 1 is an illustration that depicts the assignment of ULROs comprising permanent ID codes, to locations in an electronic file-of-reference, in accordance with an embodiment of the invention.

Generally described, the invention presents a method and system for creating universal location referencing objects (ULROs) for use in conjunction with electronic documents, electronic databases, and electronic maps, which are collectively referred to herein as "electronic spatial data files". Virtually everything stated herein regarding one type of electronic spatial data file can also be applied to another type of electronic spatial data file with no loss of applicability. A single logical spatial data file may be partitioned. One logical electronic spatial data file may thus comprise one or more physical files, which may or may not have geographic definitions.

The following terms are used throughout this document:

Feature—A geographic feature (referred to herein simply as a "feature") is an idealized map representation of an actual object from the real world, which is useful to that map representation. Features have a dimension, and most often but not always have geometric representations. Features might not be actually visible in the real world: such as borders or intersections, yet they can be represented in a map model. Features have a type and a class, which together allow the system to distinguish one feature from another, while also preserving similarities between features that are alike.

Dimension of Feature—Features are often represented in the map model in a more simple way than in their full "real world" complexity. Often the real world complexity is more of a distraction than an asset to a model, which is just trying to capture a few salient aspects of the real world in order to perform some particular function. Thus, the dimension of a feature does not reflect the real world truth, but rather what the representation has rendered.

The five dimensions that features are divided into include: point features, line features, area feature, volume features, and complex features. Real world features which are represented as points are known as point features. For example, a restaurant (even though it is, in the real world, a volume object with complex shape), when represented in the map model is conveniently represented as a point feature. So is, for example, a junction where two or more roads elements cross each other. Line features are represented as linear or simple curved segments (and as such have an extent which runs between point features or intermediate shape points). Roads, borders, rivers are some examples of line features. Of course, these real world objects are not razor-edge thin, but in the map model they are represented as idealized center lines, ignoring their actual width. Lakes, parks, and administrative areas are examples of area features. Volume features, such as buildings, (absent from most map models) are represented as a construction of connected area features in a way that resembles the real world, although quite often with much less detail. Lastly, complex features are features which are not "atomically" defined (this term is described in further detail below).

Type of Feature and Class of Feature—Types and classes are subcategories of features that enable them to be distinguished. Roads, rivers, train tracks, cities, counties, mountain peaks, bus stops, intersections, bridges, restaurants, hotels, rest areas are but a few examples of types of features. In most commercial map models there may be thousands of different feature types. The ISO-GDF (Geographic Data File) map format is one standard format, which, among other things, attempts to list a corpus of well-known feature types. Complete details of the GDF format are described in the ISO specification "ISO 14825: Intelligent Transport Systems—Geographic Data Files (GDF) Overall Data Specification", incorporated herein by reference.

Within a particular type of a feature there may also be a variation. For example, there are different classes of roads in the world: highways, major roads, minor roads, rural roads, residential roads, slip roads, dirt roads, and goat trails. While these are all of the feature type "road", they differ in their various classifications—hence a feature class is subordinate to the feature type.

Geometry of Feature—In the computer map model, features often have a geometrical representation of the feature's shape. Point features are representation by a single node. Line features are often represented by linear segments—edges—which may run through a sequence of shape points. Area features may be represented by a collection of faces, each of which consists of edges delineating its boundary. Area features may be disconnected or may even have holes in them. Volume features may be represented by volume geometry, which might contain cavities.

Topology—Topology is a set of mathematical properties that are used as a means of capturing connectivity relationships between features which remain true even when the geometry (shape) of the feature might undergo some change. Geometries of some dimension are bounded by geometries of lesser dimension. Volumes are bounded by areas. Areas are bounded by linear segments, linear geometries are bounded by points. Inversely, points are co-bounded by linear geometries. Linear boundaries are co-bounded by areas. Finally, areas are co-bounded by volumes. Topology may be an aspect of the features themselves, or of the geometry which captures their shape.

Simple Feature—Point features, line feature, area features, and volume features are simple features, since they are directly modeled by assigning geometrical shapes to them.

Complex Feature—Conversely, complex features may be indirectly defined by other features (simple or complex), as well as by direct geometrical rendering. For example, the state of California may be represented not by running its boundary with shape points (which would make it a simple area feature), but rather as the sum of its counties (which themselves may be simple or complex features). California State, rendered as a complex feature, is a single feature, which is defined in a complex way by referring to other features. Roads which consist of two road elements—one in each direction of traffic—are another common example of a complex feature. When two complex roads meet, a complex feature is declared, namely, the complex intersection. Often an intersection can be thought of as four junctions, where the simple road elements cross each other.

Plurality of Features—Both the simple and complex features described above are examples of single features. It is, however, sometimes useful to think about several features at once, hence creating a plurality of features. For example, the collection of all of the restaurants in San Francisco, or all of the counties in California serve as examples of a plurality of features. Note that the plurality of features (for example, all the counties in California) is a different concept from the single complex feature of the State of California (although in this example they do have the same geometric footprint).

Sub-Set of Feature—It is sometimes convenient to identify a portion, sub-set, or a part of a single feature. Sometimes such parts may be features in their own right, but at other times, such parts are mere fragments, which on their own would not be actual features. Examples of a sub-set of a feature include a single county of the State of California feature, a segment of road element spanning just a fraction of a block between two intersections, or floors 4 through 17 of a 30-story building.

Attribute—Features, plurality of features, and sub-sets of features may have attributes. Attributes are provided in large catalogs, and there may be thousands of different attributes applying to features in a commercial computer map model of the real world. The attribute type is what captures the different attributes from the catalogue. Speed limit, length, direction of traffic flow and restaurant opening hours are but a few examples of such attributes.

Relationship—Relationships are comprised of two or more features "participating" in some meaningful connection to each other. For example, a road element might split into several road elements at some junction, and hence all of those features are in a "fork" relationship to each other (each feature playing a different role). Relationships are also provided in large catalogs, and, as with attributes, hundreds of such relationships are possible in actual commercial digital map models. Not all relationships are geometric, since many are developed by modeling real-world activities. For example, the restaurant that validates parking for a particular parking garage represents one type of business relationship between two features.

Geographic item—For the purpose of this description, a non-ISO standard term is employed here. A geographic item is defined here to be either a feature, a plurality of features, a sub-set of a feature, or an attribute.

Location—The location where a feature is in the real world is distinct from the feature itself. For example, while the feature may be the restaurant, its location can be specified as some latitude, longitude (lat/long) coordinate pair, or coordinates from some similar geodetic referencing system, or as a human readable address, (for example "322 Battery Street" in San Francisco). Locations should not be confused with features or with the other geographic items associated with the locations.

Hierarchy of features—Features often form a hierarchy of construction. For example, a country may be comprised, or made up, of States or Provinces, while States may be comprised of counties etc. In a similar manner, roadways are made up of many block face road elements. The roads and parks and buildings of the complex area which comprise "the Stanford University campus area" are parts of the larger feature. The hierarchy of features is a special case of a relationship between features, and it can be explicitly captured and represented, or not.

Point of interest—A point of interest (POI) is a special type of point feature, in particular it is a type that may comprise other more specific types, such as a restaurant, hotel, museum etc.

As described herein, in accordance with an embodiment, a ULRO comprises a permanent identification code and sufficient information designed to uniquely identify a selected location. A location, in turn, may be associated with one or more geographic items. ULROs can be employed to establish traversable links between a file-of-reference and one or a plurality of third-party-files for a broad range of database formats. ULROs can be similarly employed to establish traversable links between two or more third-party files.

As also described herein, in accordance with an embodiment, a file-of-reference is a geospatial database used for permanent storage of a document owner's geographic data. A file-of-reference can typically be transformed into other formats that may be more appropriate for certain applications. In accordance with an embodiment there is only one file-of-reference database identified to support ULROs. A third-party file is any file that contains some element of spatial data, which may consist of geographic features, attributes of features or relationships of two or more features. A third party file is distinct from the file-of-reference.

ULROs uniquely correspond to a particular location. A document need not be a map in order to comprise a geographic item that is associated with a location. ULROs can be easily updated as information changes and as more precise information is obtained. ULROs point to geographic items in two or more different files that are associated with the same location, so that a traversable link or connection is effectively created between the two files. ULROs are not required in order to create traversable links between different documents comprising geographic information. ULROs do, however, substantially reduce the number of connections required to create traversable links between each of a set, N, of geographic items. Generally the N geographic items can be found in M separate files, where M is a value less than or equal to N. Using a traditional approach, each document would be required to point to each other document, and each document would then in turn be pointed-at by each other document, for a total number of pointers on the order of N! (N factorial). The present invention makes possible a star configuration, which reduces the total number of pointers required, to a number in the order of 2 times N. For a large number of documents, i.e. for a large value of N, this lowers the number of connections by several orders of magnitude. Furthermore, since (a) the total number of connections is much smaller; and (b) the ULRO technique eliminates the need to perform multi-discovery over many files in favor of a direct, pointered access to those files; the resultant ability to retrieve related map data is much faster using a ULRO than with traditional approaches.

Example Implementation and Usage

In accordance with an embodiment and an example implementation, a ULRO corresponds to a location associated with a geographic item in an electronic file comprising spatial data. The ULRO comprises eight principal components:

1) a set of name information (for example, the address "32 El Camino Real");

2) a super-set of coordinates comprising k sets of coordinates, where k is the number of geographic points in the location (for example, a point location for the address "4 Embarcadero Center, San Francisco" is an example of a set of coordinates that could be comprised in the super-set: −122.39730 degrees longitude, 37.79519 degrees latitude, elevation of 3 meters above sea level);

3) a universal location referencing code (ULRC) uniquely corresponding to the location (for example, 63573);

4) a file-of-reference pointer field comprising a file-of-reference pointer, either contained in a "side file" located externally to the ULRO, or located internally to the ULRO;

5) for each geographic item associated with this location, a pointer field comprising a third-party file pointer;

6) a file-of-reference back-pointer field comprising a file-of-reference back-pointer;

7) a third-party file back-pointer field comprising one or more third-party file back-pointers; and 8) a metadata field. A metadata field comprises metadata relating to the ULRO.

Of the above-described fields in the ULRO, the only mandatory field is the ULRC. In accordance with an embodiment, it is also mandatory that the set of name information and the set of coordinates not both be blank, although either one or the other can be blank for a particular ULRO. The actual requirements for each field may vary depending on the actual implementation.

In accordance with an embodiment, the first two of these components, i.e. the set of name information, and the super-set of coordinates (such as longitude, latitude, elevation or a linear referencing system such as those used in conjunction with major motorways or cell phone towers), may be thought of as coordinates in two different reference spaces. The geographical coordinate reference space is mathematically based, precise, and exhaustive in the sense that it uniquely and unmistakably names every point on earth. The name reference space, by contrast, is linguistically and historically based, imprecise, and incomplete. Names are often duplicated multiple times between different objects in ways that can be trivial or can be confusing. For example, Paris is the capital of France, in addition to being a city in Texas, and a town in Maine. Even a name such as "the Eiffel Tower" can refer both to one of France's most beloved landmarks as well as to its imitation in front of a popular hotel in Las Vegas. By contrast, no confusion occurs when one is provided with coordinates such as −122.39730 degrees longitude, 37.79519 degrees latitude, and 3 meters above sea level.

In accordance with an embodiment, the set of name information further comprises one or more of the following: 1) an address, such as 1a) a postal code, 1b) a street number, 1c) a street name; 1d) a hierarchical area address system with a sequence of names; and 1e) other address information; 2) a named place; 3) geographic name information; 4) other types of name information such as telephone numbers and 5) any other name meta-information. Geographic name information in turn comprises one or more of the following: 5a) name information for a point feature; 5b) name information for a line feature; 5c) name information for an area feature; 5d) name information for a volume feature; 5e) name information for a segment of a line feature; 5f) name information for a sector of an area feature; 5g) name information for a section of a volume feature; and 5h) name information for a plurality of related geographic items.

In accordance with an embodiment, the hierarchical area address system includes information on the relationship among at least two of the types of geographic information. For example, name information in the case of the University of California, which is an area feature, could include the fact that the University is located in Berkeley, which is in turn located in Alameda County, which is in turn in California, which is in turn in the United States. By comparison, "El Camino Real" is a name for an entire street, which forms a line feature. A line feature is described by a series of points. The address "32 El Camino Real" is a point address at a specific location along the line feature. Clearly, the address "32 El Camino Real" can occur in various different cities (and or counties). Each of those occurrences is a point address located at a specific location along the line feature or at a point feature. To uniquely designate it, it is often necessary to add an appropriate city, county and state context.

In accordance with an embodiment, the super-set of coordinates comprises a number k of coordinate sets, wherein k is the number of geographic points comprised in the location. Each coordinate super-set comprises one or more of a geographic coordinate set. Each coordinate super-set may in addition comprise one or more of a coordinate classification such as a defined coordinate reference system. One such geographic coordinate set comprises the coordinate reference system of a latitude and a longitude, and may in addition comprise an elevation. Other coordinate sets may include other geographic coordinate reference systems such as Universal Transverse Mercator (UTM), or a linear referencing system such as those used in conjunction with major motorways or cell phone towers.

In accordance with an embodiment, a third component of a ULRO is a ULRC. A ULRC is assigned so as to uniquely correspond to the location. Once a ULRC is retired, it cannot be reused. In one embodiment, the ULRO comprises a counter capable of ensuring that the assigned ULRC was not previously assigned to another location. According to another embodiment, once created, a ULRO may be stored in a central repository of ULROs, each of which is indexed according to its ULRC. This provides an alternative way to the counter of ensuring that ULRC's are not reused. When an already created ULRC is needed, the repository recognizes this and provides the appropriate ULRC, so that a new one is not created, which would be duplicative, needless, and confusing.

It may not be immediately apparent to the reader why both the set of name information, and the super-set of coordinates (components 1 and 2 respectively) of the ULRO are necessary when the ULRC is also incorporated as part of the ULRO. However, such apparent redundancy is desirable to ensure smooth, error-free integration of information from different sources. By way of example, a determination may be needed as to whether new item 3823 from data source B can be associated with an existing ULRO, or alternatively needs a new ULRO created. Name information and coordinate information serve as a means of discovering the correct ULRO, if it exists. Once so discovered, the geographic item then points to that ULRC, and future retrievals no longer require name and coordinate comparisons. If no such ULRO is found, then a new ULRO is created and the geographic item is associated with that. Otherwise, it might, for example, be possible to confuse the Canadian province of Ontario with the town of Ontario in Southern California, or to confuse "32 El Camino Real, Menlo Park" with "32 El Camino Real, Palo Alto".

It is common for a location to have the same name as the street on which it is located, and it is extremely common for streets of the same name to comprise multiple sections located at a number of different places in a particular city. Some American states even have more than one municipality of the same name, making confusion likely in the absence of such additional information as name information and coordinate information. Thus, all three are necessary to adequately describe a particular location—the first two being needed to describe the location and the third needed to effectively facilitate traversibility and compactness.

As a practical matter, most files will contain some form of data belonging to at least two of these three categories of information. Under most circumstances, the two categories will suffice to form the correct item-to-item link, but certainly with all three categories present, such a linkage can be formed without problem. Once a ULRO is created all associated geographic items can be linked in third party data. It is at this time that all the fields of the ULRO can be used to make an accurate decision as to which geographic items should go with which ULROs (i.e. which objects are different manifestations of the same location).

For example, in the case of "El Camino Real", an object in the file-of-reference representing that street might be preliminarily equated with an apparently corresponding object in a map created by a third party. The two maps might disagree about some details relating to the street, but once the equivalence of the two objects is established, then name information and coordinates become less critical to the linkage of the two objects and the two maps.

Furthermore, the ULRC uniquely corresponds to the location and is not duplicated with any other location. Once assigned, a ULRC can only be used with reference to the location to which it is assigned. The ULRC will normally remain the same for the same location. The fact that a particular location is always described by the same ULRC facilitates reconciliation of different maps that may have been created pursuant to different mapping algorithms and/or pursuant to different mapping technologies. The ULRC enables the matching and/or joining of different electronic files, such as electronic maps or an electronic map with a series of third party spatial data content files.

In accordance with an embodiment, a fourth component of the ULRO is the file-of-reference pointer field. The file-of-reference pointer field comprises a file-of-reference pointer, which uniquely designates a geographic item associated with a location in the file-of-reference. Each file-of-reference pointer may further comprise one or more of the following: a time of creation of the file-of-reference point, a type and class of the file-of-reference pointer, and other file-of-reference information.

In accordance with an embodiment, a fifth component of the ULRO is the third-party file pointer field. The third-party file pointer field comprises one or more third-party file pointers, each of which uniquely designates one or more geographic item that refer to said location in one of said one or more third-party files. The number, n, of third-party-pointers pertaining to a particular location equals the number of separate geographic items summed over the number of third-party files comprising the location. There can be many third-party databases, but only one file-of-reference.

The third-party file pointer field may further comprise one or more of the following: a time of creation of the third-party file pointer, a type and class of the third-party file pointer, and other third-party file pointer information. The third-party file pointer field may either be comprised in the ULRO or may be comprised in a side file external to the ULRO.

In accordance with an embodiment, a sixth component of the ULRO is the file-of-reference back-pointer field. The file-of-reference back-pointer field comprises a file-of-reference back-pointer pointing from said file-of-reference back to the ULRC. Each file-of-reference back-pointer may further comprise one or more of the following: a time of creation of the file-of-reference back-pointer; a type and class of the file-of-reference back-pointer; and other file-of-reference back-pointer information.

In accordance with an embodiment, a seventh component of the ULRO is the third-party file back-pointer field. The third-party file back-pointer field comprises one or more third-party file back-pointers, wherein each said third-party file back-pointer uniquely points from one of said third-party files back to said ULRO, namely the ULRC. The number, n, of third-party-pointers pertaining to a particular location equals the number of separate geographic items summed over the number of third-party files comprising the location. Each third-party file back-pointer may comprise one or more of the following: a time of creation of the third-party file back-pointer, a type and class of the third-party file back-pointer, and other third-party file back-pointer information.

In accordance with an embodiment, an eighth component of the ULRO is the metadata field. The metadata field comprises one or more of the following: a ULRO classification, a time of creation of the ULRO, a type and class of the ULRO, and other metadata information.

The file-of-reference pointer field and the third-party file pointer field may each either be contained within the ULRO or may be contained in a side file external to the ULRO. For any embodiment in which the ULRO does not internally contain a file-of-reference pointer field, a side file containing the file-of-reference pointer field is defined. Similarly, for any embodiment in which the ULRO does not internally contain a third-party file pointer field, a side file containing the third-party file pointer field is defined. Those embodiments in which the ULRO internally contains both a file-of-reference pointer field and a third-party file pointer field will typically not require use of side files. On the other hand, if the ULRO does not internally contain both a file-of-reference pointer field and a third-party file pointer field, side files containing the needed pointer field(s) will be necessary. When a new third-party is added a small modification to the URLO is needed (but only if the third party pointer isn't stored in a side file), namely, a third-party pointer field is added to the ULRO (when in a side file, that is done in the side file and no modification to the ULRO proper is required).

Application of ULROs to Virtual Databases and Virtual Maps

As described above, ULROs are designed to be used with reference to locations. A ULRO is comprised of a ULRC, which comprises a permanent identification code specifically designed to refer to a geographic item that is associated with a location. The ULRO encodes information about its corresponding location, thereby facilitating the grouping of related geographic items associated with that location that are spread over possibly many files As such, ULROs (and more particularly ULRC's) allow for the recognition of the equivalence or identity of features in one or more different maps. ULROs facilitate the dynamic combination of one or more maps into one virtual map with traversable connectivity between different geographic items regardless of the map(s) that are the ultimate origins of each geographic item. For example, if one considers a San Francisco map, embodiments of the present invention enable the creation of a virtual map with traversable connectivity between elements derived from a San Francisco street map, a San Francisco railroad map, and a San Francisco restaurant and parking facilities data file. The interaction of streets, restaurants, parking facilities and railroads with each other can then be captured and offered to the operator. With the aid of the virtual database technology, described in co-pending application Ser. No. 11/742,937 entitled "SYSTEM AND METHOD FOR PROVIDING A VIRTUAL DATABASE ENVIRONMENT AND GENERATING DIGITAL MAP INFORMATION," inventors Gil Fuchs, et al., filed May 1, 2007 and incorporated herein by reference, relationships between streets, restaurants, parking facilities and railroads can be specified by the operator, and displayed as an output from the virtual map. For example, the operator may wish to know the street on which a particular restaurant is located, and what parking facilities will take a parking validation from that restaurant or what the train schedule is for trains arriving at the nearby railroad station. This is more powerful than the traditional layered view. Using traditional techniques, coordinates of a location (which might be sufficiently accurate or not), together with the process of reverse geo-coding, could be used to discover which other streets are "near", but that process is both time-consuming and inaccurate. Also, with traditional techniques no mechanisms exist to enable relationships between disparate geographic items to be maintained, short of integrating all data into a single electronic map file. In accordance with an embodiment of the present invention, direct pointing and explicit relationships allow for both quick and indisputably accurate results.

Furthermore, additional attributes can also be folded-in regardless of whether the information is contained in the form of a map or in another form. For example, if the restaurant information is a text listing of restaurant names, it can be combined with the railroad and street maps to create a virtual map as easily and effectively as if the restaurant information was in map format. Of course, the name of a restaurant must be augmented with spatial data, address or coordinates, so it can be linked to the appropriate ULRO. Further information that may be integrated from data in map format, text format, or another format could include, for example, the age of each house on a particular street or in a particular area, a list of owners of restaurants, a list of types of food served by each restaurant, train schedules, data on the age of each train track, or the position of entrances to the area's rapid transit system. Once created, a virtual map is operationally indistinguishable from a single map with traversable links between items. Through the use of ULROs, it is easier for operators of end-user applications to obtain spatially relevant data from virtual maps. Virtual maps are capable of using embodiments of the invention to usefully and accessibly combine the information in a file-of-reference with information comprised in one or more of a variety of third-party sources.

ULRO Example Implementation

As described above, in accordance with an embodiment, some fields in the ULRO can be left blank, while the only mandatory field is the ULRC. It is also mandatory that the set of name information and the set of coordinates cannot both be blank at the same time, although either one or the other can be blank for a particular ULRO.

FIG. 1 is an illustration that depicts the assignment of ULROs comprising permanent ID codes, to geographic items associated with locations in an electronic file-of-reference, in accordance with an embodiment of the invention. As shown in FIG. 1, ULROs are assigned to geographic items associated with a location 120, 122, 124, 126 in an electronic file-of-reference 130. In keeping with the definition provided above, the geographic items can be any of a feature, a plurality of features, a sub-set of features, or an attribute associated with a physical location, so that in FIG. 1 the geographic items 120, 122, 124, 126 may in actuality be associated with a single physical location. ULROs 110, 112, 114, 116 comprise respectively ULRC's 134, 136, 138, 140. In accordance with an embodiment each ULRC may in turn comprise a permanent identifier or permanent ID. The ULRO can be easily and accurately maintained and updated, and can be used to link the geographic items associated with locations in the file-of-reference with corresponding location information 155, 156, 157, 158, 159 in one or more third-party files 150, 152, 154. As shown in FIG. 1, a single geographic item associated with a location, for example location 120, may be linked to a single ULRO 110 that links to a single third-party file 150. Alternatively, a single geographic item associated with a location, for example location 122 may be linked to a single ULRO 112 that links to a plurality of third-party files 150, 152.

The use of ULRO hierarchies, and ULRO groups, both of which are described in further detail below, allows other types of linking, so that almost any combination of file-of-reference and third-party-file is possible. Furthermore, links 160, 162, 164, 166, 170, 172, 174, 176, 180 can be either unidirectional pointers, bidirectional pointers, or a mix of both uni- and bi-directional pointers. This feature provides that, while in FIG. 1, the file-of-reference 130 appears as a base map, it is also possible to treat any of the third-party files equally as the file-of-reference, and for the locations therein to be similarly linked to information in the other files. The bidirectional nature of the ULRO mapping allows any third-party file to act as the file-of-reference, and allows the file-of-reference to act as a third-party file, depending on the particular application.

Figure 2:
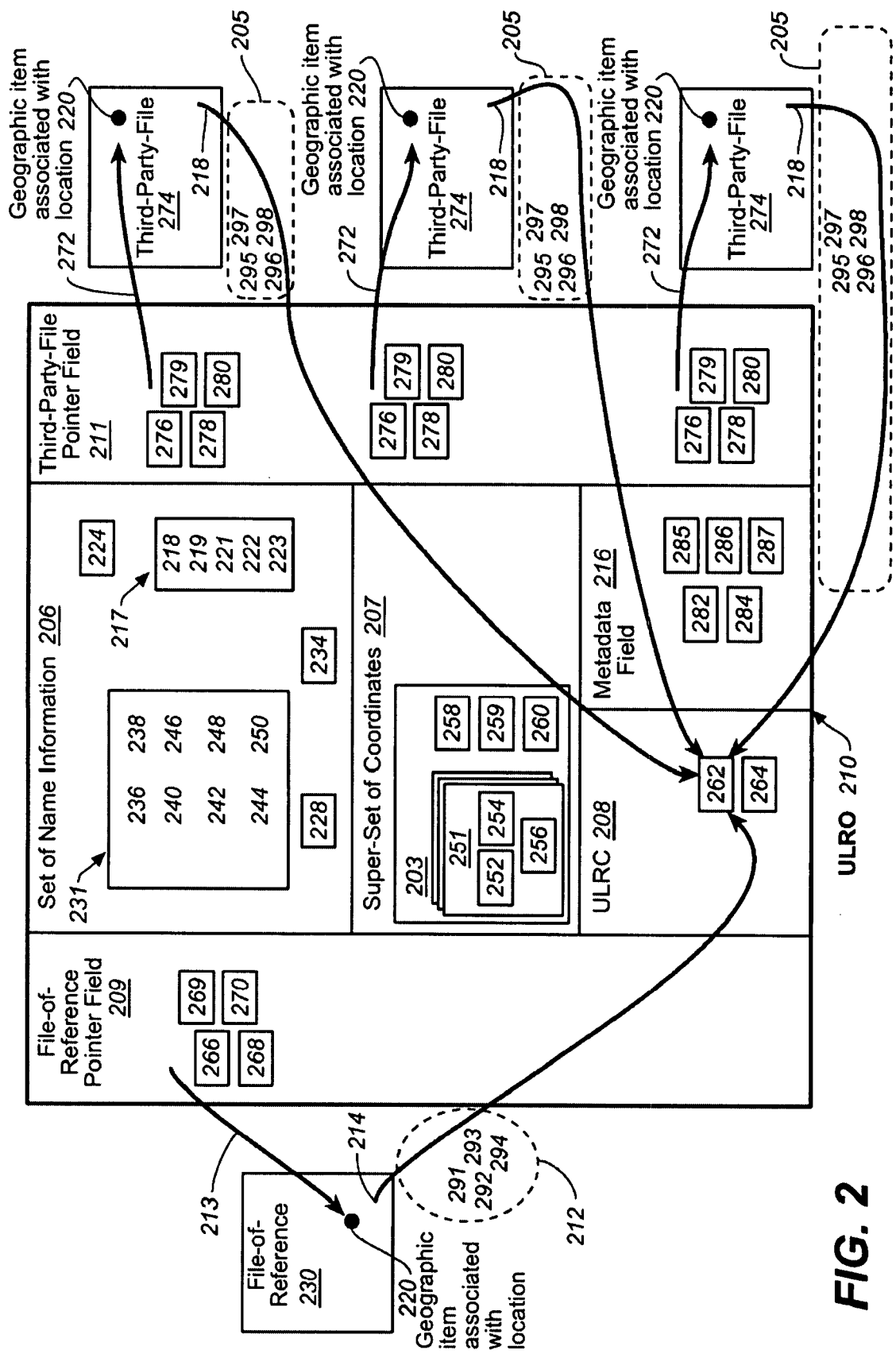
FIG. 2 is an illustration that depicts a ULRO corresponding to a selected geographic item associated with a location in a file-of-reference, in accordance with an embodiment of the invention.

FIG. 2 is an illustration that depicts an environment including a ULRO corresponding to a selected geographic item associated with a location in a file-of-reference, in accordance with an embodiment of the invention. As shown in FIG. 2 the ULRO 210 allows for mapping of location-related information between an electronic file-of-reference 230, and one or a plurality of third party files 274, each of which files comprising one or more geographic items associated with a location 220, together with associated pointers and information linking the files. As described above, the only mandatory field in the ULRO is the ULRC 208. It is also mandatory that the set of name information and the set of coordinates not both be blank, although either one of these fields can be blank for a particular ULRO.

As shown in FIG. 2, in accordance with an embodiment, the ULRO logically resides in three places within the ULRO environment. The bulk of the ULRO can reside almost anywhere, such as within a file on a server connected to the Internet. The complete ULRO also includes other components, (i.e. back-pointers), that are physically associated with the file-of-reference 230, and with the third-party files 274 respectively. In accordance with an embodiment, the ULRO 210 comprises a set of name information 206, a coordinate super-set 207, a ULRC 208, a file-of-reference pointer field 209, a third-party file pointer field 211, a file-of-reference back-pointer field 212; a third-party file back-pointer field 205; and a metadata field 216.

In accordance with an embodiment, the set of name information 206 comprises one or more of the following: 1) an address 217, which in turn comprises one or more of the following: 1a) a postal code 218, 1b) a street number 219, 1c) a street name 221; 1d) a hierarchical area address system with a sequence of names 222; and 1e) other address information 223; 2) a named place 224; 3) a telephone number 228; 4) geographic name information 231; and 5) other name information 234. In accordance with an embodiment, the geographic name information 231 comprises one or more of the following: 4a) name information for a point feature 236; 4b) name information for a line feature 238; 4c) name information for an area feature 240; 4d) name information for a volume feature 242; 4e) name information for a segment of a line feature 244; 4f) name information for a sector of an area feature 246; 4g) name information for a section of a volume feature 248; and 4h) name information for a plurality of related geographic items 250.

In accordance with an embodiment, the ULRO comprises one, or a plurality, k, of coordinate super-sets 207, wherein k is the number of coordinate super-sets comprised in the physical location that is in turn associated with the geographic item 220. For clarity, in the example shown in FIG. 2, a single coordinate super-set 203 is illustrated, but a ULRO could comprise one, two, or more coordinate super-sets. Each coordinate super-set 203 comprises k geographic coordinate sets 251. The geographic coordinate set 251 in turn comprises geographic coordinates, such as a latitude 252 and a longitude 254, and may also comprise an elevation 256. In accordance with an embodiment, the coordinate super-set 203 also comprises a coordinate classification 258 and other coordinate information 260. Optionally, information relating to a linear referencing system 259, such as those used in conjunction with major motorways or cell phone towers, can be included. This may, for example, include information relating to a cellular phone network associated with the location 220. This allows the system to use cell phone towers or linear referencing schemes or a combination of any of these instead of geographic coordinates, or alternatively the system can use a combination of both geographic and cell phone coordinates.

In other embodiments, the coordinate super-set can be assigned with reference to a transportation network such as a railway system or a highway linear referencing system.

As described above, the ULRC 208 uniquely corresponds to the location. In accordance with an embodiment, the ULRC 208 comprises an identification code 262. The ULRC 208 may also comprise other ULRC information 264.

In accordance with an embodiment, the file-of-reference pointer field 209 comprises, when appropriate, a file-of-reference pointer 213 that designates said location 220 in said file-of-reference 230. Each file-of-reference pointer 213 may further comprise one or more of the following: a time of creation 266 of the file-of-reference pointer; information 268 identifying a type and class 269 of the file-of-reference pointer field, and other file-of-reference pointer field information 270.

In accordance with an embodiment, the third-party file pointer field 211 comprises one or more third-party file pointers 272, each of which uniquely designates one or more said location-associated item(s) 220 in one of said one or more third-party files 274. The number of third-party file pointers 272 pertaining to a particular one geographic item associated with a location 220 equals the total number of associations within those third-party files 274 that comprises the geographic item associated with the location 220. For any particular third-party file, there may be either one, or more than one association within each file. Assuming that each third-party file will usually provide at least some information for the geographic item associated with the location, then the total number of third-party pointers will typically be at least equal to the number of third-party files, but will often be greater by the number of additional associations. Each third-party file pointer 272 may further comprise one or more of the following: a time of creation 276 of the third-party file pointer, a type 278, and class 279 of the third-party file pointer, and other third-party file pointer field information 280.

In accordance with an embodiment, the file-of-reference back-pointer field 212 comprises a file-of-reference back-pointer 214 pointing from the file-of-reference 230 back to said central component of said ULRO 210, and more specifically back to the ULRC code, 262. The file-of-reference back-pointer, while a part of the logical ULRO, is resident in the file-of-reference and is there to facilitate the two way traversal between data items. Each file-of-reference back-pointer 214 may further comprise one or more of the following: a time of creation 291 of the file-of-reference back-pointer; a type 292 and class 293 of the file-of-reference back-pointer; and other file-of-reference back-pointer information 294.

In accordance with an embodiment, the third-party file back-pointer field 205 comprises one or more third-party file back-pointers 218, wherein each third-party file back-pointer 218 uniquely points from one of the third-party files 274 back to the ULRO 210, and more specifically back to the ULRC code 262. The third-party file back pointer, while a part of the logical ULRO, is resident in the third-party file, and is there to facilitate the two-way traversal between data items. As with the number of third-party file pointers above, the total number of third-party file back-pointers 218 associated with a particular location 220 will typically be at least equal to the number of third-party files 274 comprising the location, but since some third-party files may provide two or more associations, the total number will often be greater by that number of additional associations. Each third-party file back-pointer 218 may further comprise one or more of the following: a time of creation 295 of the third-party file back-pointer, information identifying a type 296, and class 297 of the third-party file back-pointer, and other third-party file back-pointer information 298.

The embodiment shown in FIG. 2 also includes a metadata field 216 comprising one or more of the following: a ULRO classification 282, a time of creation 284 of the ULRO, a type 285 and class 286 of the ULRO, and other metadata information 287. In accordance with an embodiment, the metadata information can be used to create hierarchical links between the ULROs, as described in further detail below. In accordance with other embodiments, the hierarchical information can be maintained in other logical components. With the star configuration shown in FIG. 2, it is easier to add another third party or user file (i.e. the total number N then growing to N+1) without affecting all of the previous users or third parties. For example, to establish a link or "connection" between an object in a first map and an object in a second map (assuming they are different versions of the same object), the system must maintain a pointer from the first map to the second map (and also from the second map to the first map). If a third map is subsequently introduced, together with its objects, then the first and second maps must both point to the new object in this third map, and similarly the third map must point back to both the first and second maps. So over the original two links are now introduced four new ones. Using a traditional method the number of such links would be N! (N factorial). However, in accordance with an embodiment of the present invention, the ULRO provides that each of the first, second, and third maps only need to point to the ULRO of the object under consideration; while the URLO points to the objects of the first, second, and third maps. Thus, using this approach only 2 times N pointers are needed. It will be evident that, for a value of N equal to 3, then the total number of links will be identical using either approach, but for a value of N larger than 3, then the star configuration is "cheaper" (i.e. it requires fewer links). The larger the value of N, the greater the efficiencies.

Figure 3:
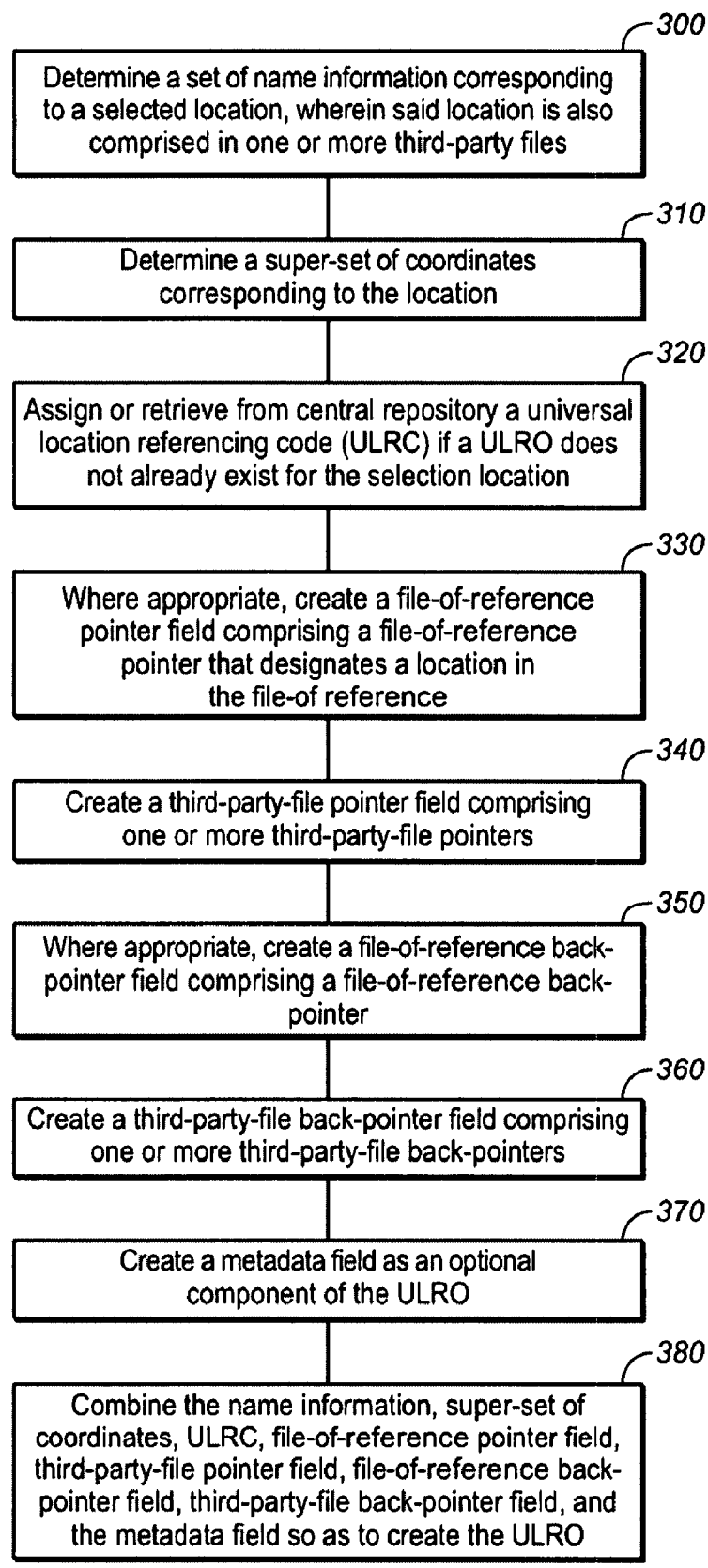
FIG. 3 is a flow chart that illustrates the typical flow of a process in accordance with an embodiment of the invention that receives information about a geographic item associated with a location, and creates a ULRO.

FIG. 3 is a flow chart that illustrates the flow of a ULRO process in accordance with an embodiment of the invention. As shown therein, the system or process receives a request for a ULRO, together with some of the information defining the location within it; and subsequently creates a ULRO. As described above, in accordance with an embodiment the ULRO comprises any of eight components: a set of name information; a super-set of coordinates; a ULRC; a file-of-reference pointer; a third-party file pointer field; a file-of-reference back pointer; a third party back pointer; and a metadata field.

As described above, the only mandatory field in the ULRO is the ULRC. It is also mandatory that the set of name information and the set of coordinates not both be blank, although either one or the other of these fields can be blank for a particular ULRO. In step 300, a set of name information corresponding to a selected location s determined, wherein the location is also contained in one or more third-party files. In step 310, a super-set of coordinates corresponding to the location is determined. Subsequently, in step 320 the system provides the assignment of a ULRC to the location, if a ULRO does not already exist for the selected location. This ULRC is permanent and unique in its reference to this location. If a ULRO does already exist, then in step 320, the full ULRO is retrieved from a central repository. In step 330 a file-of-reference pointer field is created, comprising a file-of-reference pointer that designates a geographic item associated with a location in the file-of-reference. In step 340, a third-party file pointer field is created comprising one or more third-party file pointers, each of which uniquely designates the one or more location-associated geographic items in one of the one or more third-party files. In step 350, a file-of-reference back-pointer field is created comprising a file-of-reference back-pointer pointing from the file-of-reference back to the ULRC for that ULRO. This back-pointer physically resides in the file-of-reference or in a side file connected with the file-of-reference. In step 360, a third-party file back-pointer field is created comprising one or more third-party file back-pointers, wherein each third-party file back-pointer uniquely points from one of the location-associated items of one of the third-party files back to the ULRC for that ULRO. This back-pointer physically resides in the third-party file or a side file connected with the third-party file. In step 370, a metadata field is created. Finally, in step 380, the name information, super-set of coordinates, ULRC, file-of-reference pointer field, third-party file pointer field, file-of-reference back-pointer field, third-party file back-pointer field, and the metadata field are logically combined so as to create the ULRO. In the embodiment described in FIG. 3, multiple instances of ULROs can have their central parts stored in files easily accessible to both third-party file suppliers and to virtual database (VDB) applications providers, in addition to their customers.

As described above, the only mandatory field in the ULRO is the ULRC component. Similarly, not all of the above-described steps need be executed in forming the ULRO; nor do the executed steps need be performed in a particular sequence, or even at the same chronological moment in time. For example, some information, such as a name information, may be available at a first point in time, and may be included in the ULRO then. Other information, such as a coordinate information, may only become available at a later point in time, perhaps days or months later, and may be included in the ULRO only if and when that information becomes available.

Figure 4A:
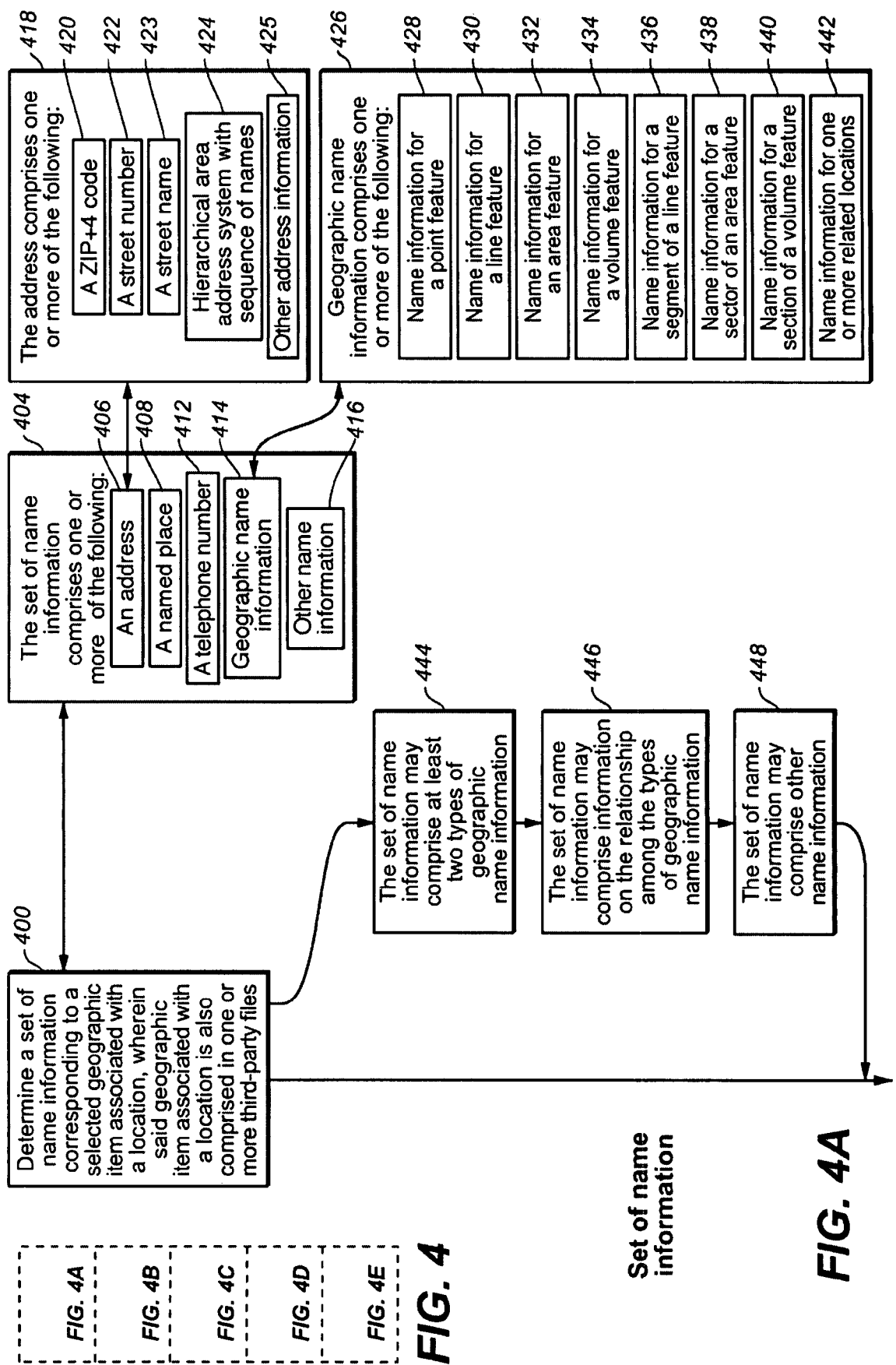
FIG. 4 is a flow chart that illustrates in more detail the typical flow of a process in accordance with an embodiment of the invention that receives information about a geographic item associated with a location, and creates a ULRO.
Figure 4B:
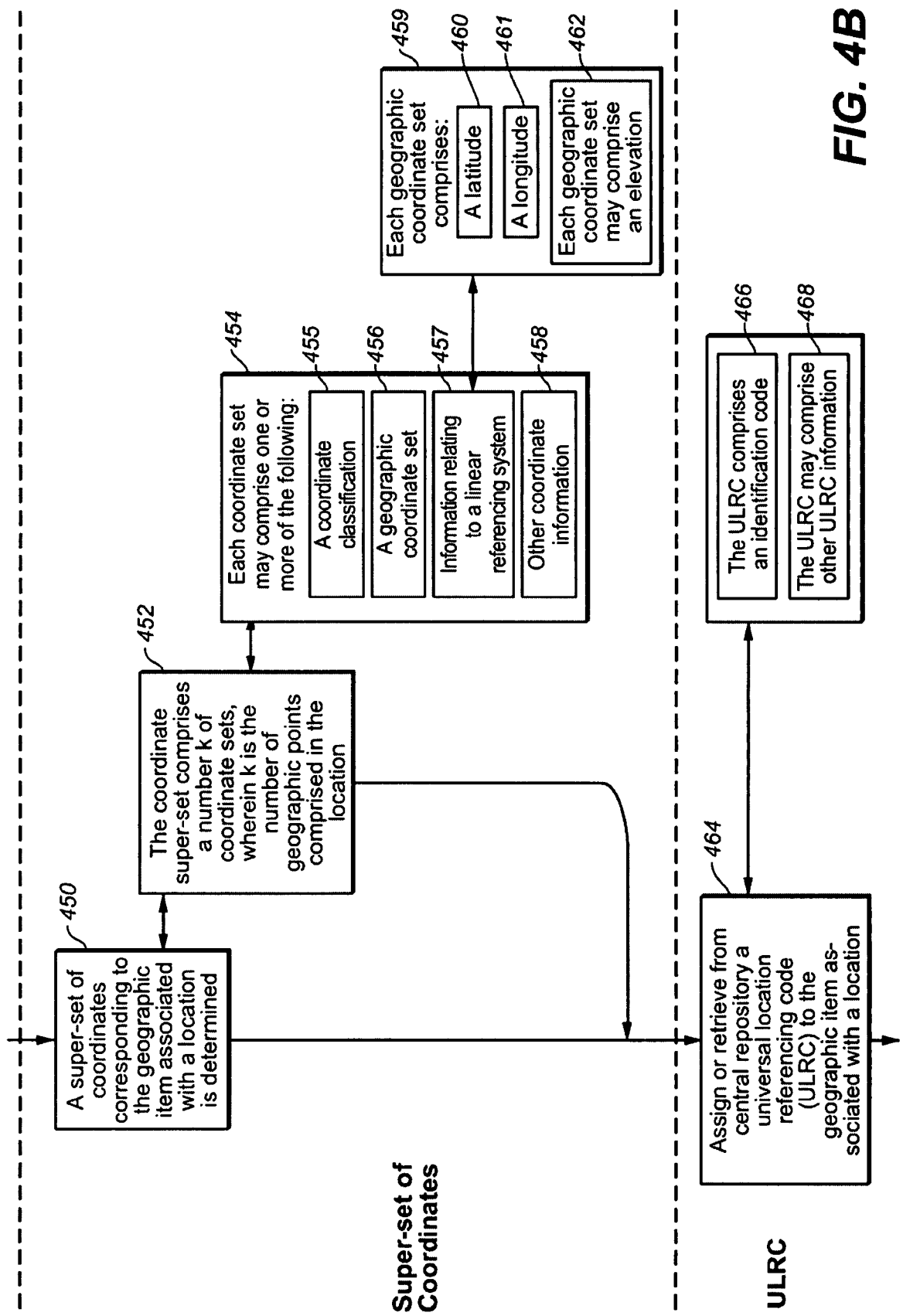

FIG. 4 is a flow chart that illustrates in more detail the flow of a process in accordance with an embodiment of the invention. Each of the steps shown in FIG. 4 corresponds largely to one or more of the logical entities shown in FIG. 2. As shown therein, the system (or process) receives information about a geographic item associated with a location, and creates a ULRO comprising any of the following components: a set of name information; a super-set of coordinates; a ULRC; a file-of-reference pointer field; a third-party file pointer field; and a metadata field; together with any applicable file-of-reference back-pointer field and third-party file back-pointer field.

The process shown in FIG. 4 comprises a number of steps or actions, which can generally be performed in any order. In particular, several of the steps are properly considered optional actions by the system, which may or may not be actually performed, such as for example, the decision to include a street number in an address, or not. As described above, the executed steps may also be performed at different chronological moments in time. The various options are shown in FIG. 4 for purposes of completeness. Depending on the actual implementation some of these steps may be entirely omitted, except that, in accordance with one embodiment the only mandatory field is the ULRC. It is also mandatory that the set of name information and the set of coordinates not both be blank, although either one of these variables can be blank for a particular ULRO.

In step 400, the system determines a set of name information corresponding to a geographic item that is associated with a location, wherein the location also has location-associated geographic items contained in a file-of-reference, or in one or more third-party files. In step 404, the system determines a set of name information that comprises one or more of the following: an address 406; a named place 408; a telephone number 412; geographic name information 414; and other name information 416. As part of the address information, in step 418, the system determines an address that comprises one or more of the following: a postal code 420; a street number 422; a street name 423; a hierarchical area address system with a sequence of names 424 and other address information 425. As part of the geographic name information, in step 426, the system determines a geographic name information that comprises one or more of the following: name information for a point feature 428; name information for a line feature 430; name information for an area feature 432; name information for a volume feature 434; name information for a segment of a line feature 436; name information for a sector of an area feature 438; name information for a section of a volume feature 440; and name information for one or more related locations 442. The set of name information for these one or more related locations is in addition to the name information for the primary location, and may include: information on the relationship among the types of geographic name information; and other name information. For example, if the ULRO defines geographic item associated with the city of name "San Francisco", then the name information for a related location might be "California", and the relationship may be of the type "city within a state".

In step 450, the system determines a super-set of coordinates corresponding to the geographic item associated with the location.

In step 452, the coordinate super-set comprises a number, k, of coordinate sets needed to describe the geometry of the location. Each coordinate set may comprise one or more of: a coordinate classification 455, geographic coordinate set 456, information 457 relating to a linear referencing system, such as those used in conjunction with major motorways or cell phone towers, and other coordinate information 458. As part of the geographic coordinate set, in step 459, each geographic coordinate set may comprise: a latitude 460, and a longitude 461, or the equivalent information from a different coordinate reference system. Each geographic coordinate set may in addition comprise an elevation 462.

In step 464, the system assigns a ULRC to the geographic item associated with the location if a ULRO does not already exist for the selected item. If a ULRO does already exist, then the ULRO is retrieved from a central repository. In step 466, the ULRC that is created or retrieved comprises an identification code. In step 468, the ULRC may comprise other ULRC information.

In step 469, when appropriate, a file-of-reference pointer field is created; comprising a file-of-reference pointer that designates said geographic item associated with the location in the file-of-reference. In step 470, the file-of-reference pointer field may comprise one or more of the following: a time of creation of the file-of-reference pointer field 471, a type and class of the file-of-reference pointer field 473 and other file-of-reference pointer field information 474. In accordance with an embodiment, the system can utilize offset pointer addressing.

In step 475, a third-party file pointer field is created. The third-party file pointer field comprises one or more third-party file pointers, each of which uniquely designates the one or more geographic items in the one of the one or more third-party files that comprised the location associated geographic item. In step 476, the third-party file pointer field may comprise one or more of: a time of creation of the third-party file pointer field 477, a type 478 and class 479 of the third-party file pointer field, and other third-party file pointer field information 480.

In step 481, when appropriate, a file-of-reference back-pointer field is created. The file-of-reference back-pointer field comprises a file-of-reference back-pointer pointing from the file-of-reference back to the ULRO, and specifically to the ULRC. In step 482, the file-of-reference back-pointer field may comprise one or more of: a time of creation of the file-of-reference back-pointer field 483; a type 484 and class 485 of the file-of-reference back-pointer field; and other file-of-reference back-pointer field information 486. The ULRO can be continuously updated and fields can be filled in at any time.

In step 487, a third-party file back-pointer field is created. The third-party file back-pointer field comprises one or more third-party file back-pointers, wherein each third-party file back-pointer uniquely points from one of said location-associated geographic items of one of said third-party files back to the ULRO. The third-party file back-pointer field may comprise one or more of the following: a time of creation of the third-party file back-pointer field 489, a type 490 and class 491 of the third-party file back-pointer field, and other third-party file back-pointer field information 492. The third-party file back-pointer is not necessarily created at the same time as the ULRO; it is often created when a ULRO receives a request from a third-party file that includes a geographic item to be associated with the ULRO.

In step 493, a metadata field may be created. In step 494, the metadata field comprises one or more of the following: a ULRO classification 495, a time of creation of the ULRO 496, a type and/or class of the ULRO 497, and other metadata information 498.

Finally, in step 499, the set of name information, the superset of coordinates, the ULRC, the file-of-reference pointer field, the third-party file pointer field, the file-of-reference back-pointer field, the third-party file back-pointer field, and the metadata field, are combined to create the ULRO.

ULRO Advanced Features

Figure 5:
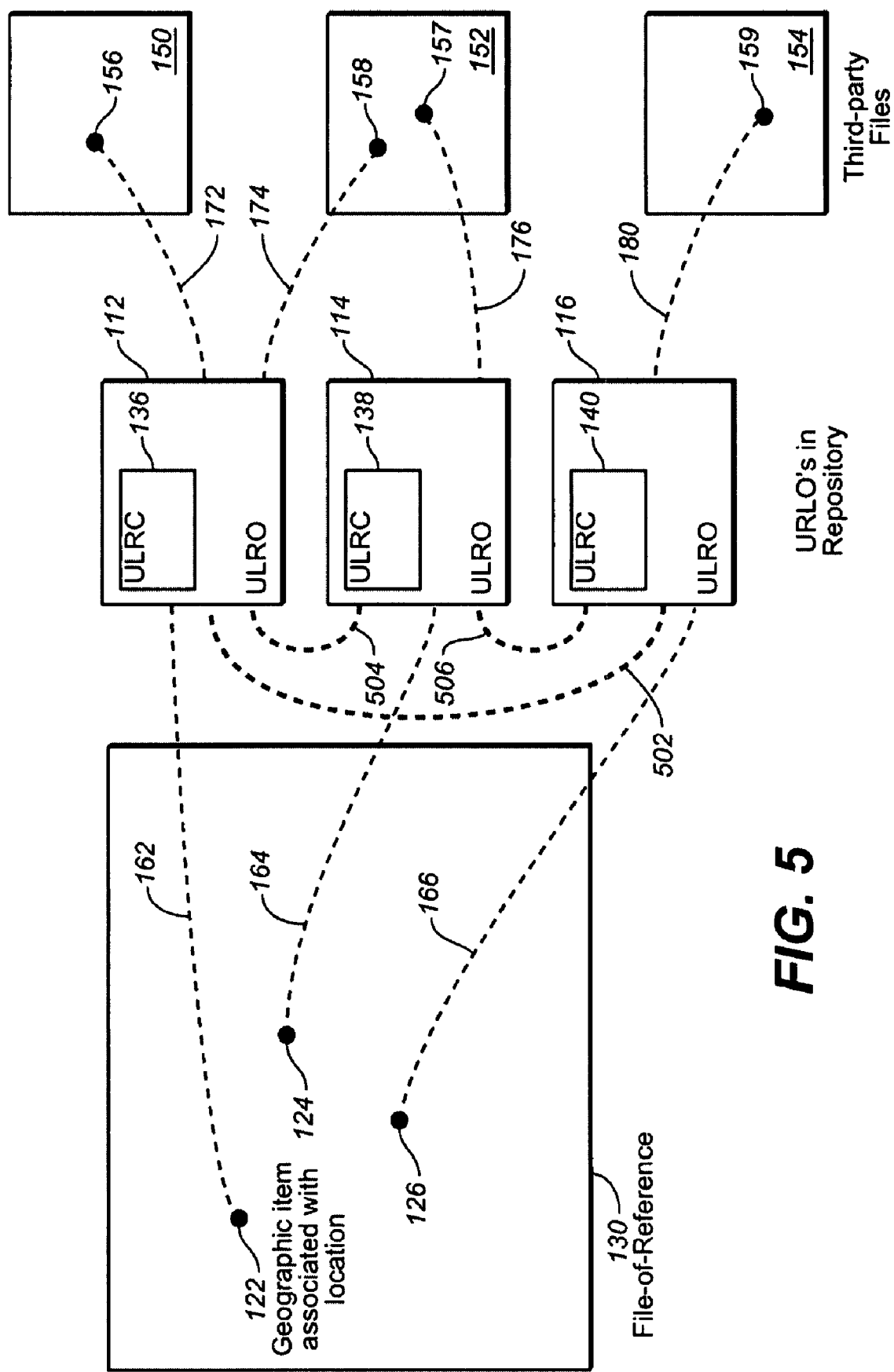
FIG. 5 is an illustration that depicts the use of ULRO relationships and hierarchies, in accordance with an embodiment of the invention.

As mentioned briefly above, several advanced features such as the use of ULRO hierarchies, and ULRO groups add extra functionality to the ULRO system described herein, and allow for great flexibility in linking geographic location information across increasing numbers of third-party files and resources:

ULRO Relationships and Hierarchies—FIG. 5 is an illustration that depicts the use of ULRO relationships and hierarchies, in accordance with an embodiment of the invention. FIG. 5 shows a system similar to FIG. 1, in which ULROs comprising permanent identification codes are assigned to geographic items associated with a location 122, 124, 126 in an electronic file-of-reference 130. The ULROs link the geographic items associated with locations in the file-of-reference with corresponding geographic information associated with a location in one or more third-party files 150, 152, 154. As shown in FIG. 5, a single geographic item associated with a location 120, may be linked to a single ULRO 112. Using ULRO relationships, this ULRO 112, may in turn be linked to other ULROs 114, 116 via ULRO relationships 502, 504. (Other ULRO relationships 506 may exist to link ULROs 114, 116 to one another). Since, for example, ULRO 114 and ULRO 116 do not themselves have a direct pointer link to the geographic item 122, without such a hierarchical link the system would only link the geographic information associated with location 122 via ULRO 112 to location-related information 156, 158. However, using ULRO relationships, the system is able to also link ULROs 114, 116, together with their location-related information 157, 159 to geographic information associated with location 122.

A special form of ULRO relationship is a ULRO hierarchy. In accordance with an embodiment, a ULRO hierarchy specifies that a first ULRO is a parent of a second ULRO; while the second ULRO is a child of the first ULRO. A parent ULRO may have many children, and grandchildren ULROs. Using ULRO hierarchies, the system can provide relationships that equate to familiar and easily understood concepts. For example, if ULRO 116 represents the city of San Francisco, then its parent ULRO 114 may be the state of California, and its parent the entire United States 112. When the ULRO relationship is a hierarchy, then to both avoid circular relationships, and to reduce the number of links that must be changed to reflect updated information, usually only parent/child links are maintained. So, as shown in FIG. 5, only the parent/child links 504, 506 would be used. The "grandparent" link 502 would not be used, nor would it be desirable to have it present in the system.

In accordance with an embodiment, the metadata information component can be used to record and maintain the relationships and hierarchical links between the ULROs. In accordance with other embodiments, the ULRO relationship and hierarchical information can be maintained in other logical components.

Figure 6:
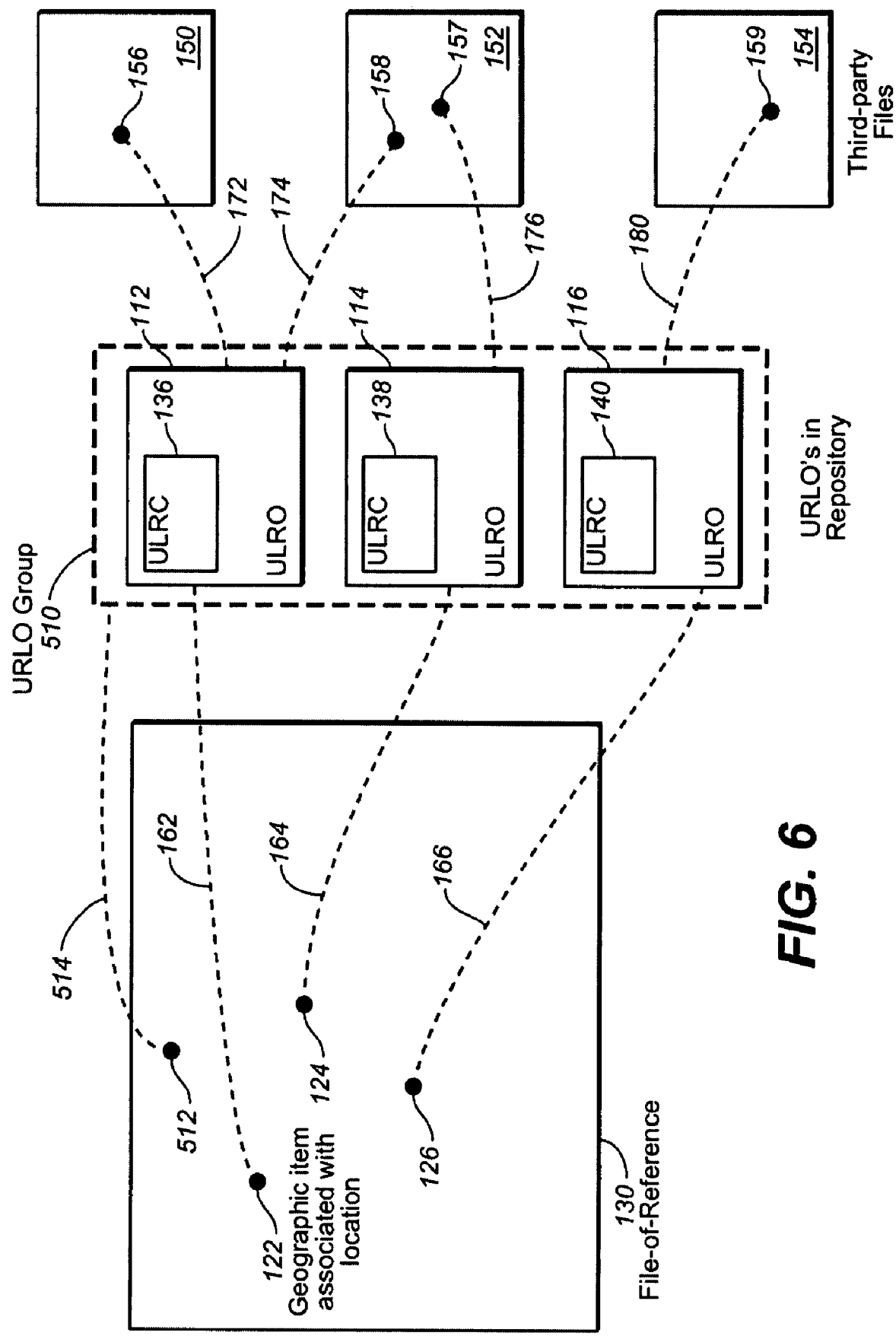
FIG. 6 is an illustration that depicts the use of ULRO groups, in accordance with an embodiment of the invention.

ULRO Groups—FIG. 6 is an illustration that depicts the use of ULRO groups, in accordance with an embodiment of the invention. FIG. 6 also shows a system similar to FIG. 1, in which ULROs comprising permanent identification codes are assigned to geographic items associated with locations 122, 124, 126 in an electronic file-of-reference 130, wherein ULROs link the geographic items associated with locations in the file-of-reference with corresponding location information in one or more third-party files 150, 152, 154. As shown in FIG. 6, in addition to the normal case in which a single geographic item associated with a location 122, 124, 126 is linked to a single ULRO 112, here another geographic item 512 can be linked using a group link 514 to a group of the ULROs 112, 114, 116, the group itself being indicated by the box 510. Linking a single location to a group in this manner allows for more optimal configuration, and also equates to familiar and easily understood concepts. For example, if items 122, 124, and 126 are local information pertaining to different counties in the state of California, then group 510 may be the entire group of ULROs for the counties in the state. Selecting item 510 is equivalent to selecting each of items 122, 124 and 126, but may be more convenient in certain applications Offset Pointer Addressing—In accordance with an embodiment, offset pointer addressing allows the system to provide information for locations for which no current object exists. In this instance, instead of specifying a pointer to the geographic item in the file-of-reference or third party file, the system can specify a pointer to another geographic item in the file, together with an appropriate offset. At a later time, direct or non-offset pointers may or may not be subsequently created for that location. In accordance with an embodiment, the offset pointer can be included in the forward pointer to file of reference, box 213, shown in FIG. 2 and described above.

Missing Pointers—In accordance with an embodiment, the ULRO technique allows the system to include support for "missing pointers". When a desired geographic item associated with a location is not present in the file-of-reference, but one or more of the third-party files do have associated information for that geographic item associated with a location, then only those pointers between the third-party file and the ULRO may be created. The pointers that would normally link the ULRO to the file-of-reference are missing. Since, as described above, the steps used to form a ULRO can be executed in any sequence, or even at different chronological moments in time; similarly the pointers between the various file-of-reference and third-party-files can also be created at different chronological moments in time. When the information becomes available, the "missing pointer" is properly formed, linking the new information to the ULRO.

System Implementation

Figure 7:
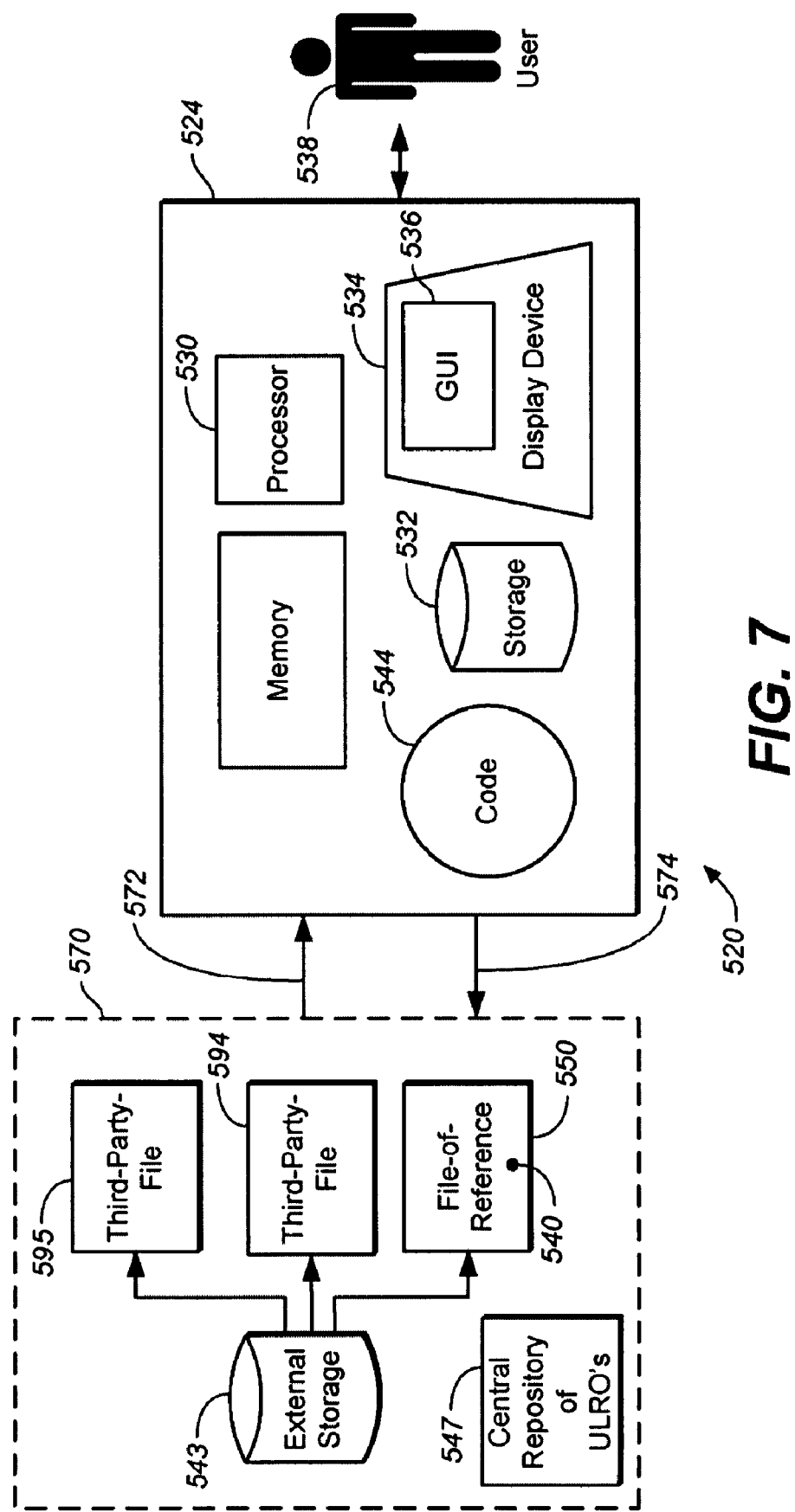
FIG. 7 is a diagram that schematically illustrates an example of a system that can be used with an embodiment of the invention.

FIG. 7 is a diagram that schematically illustrates an example of a system that can be used with an embodiment of the invention. As shown in FIG. 7, the system 520 allows for a ULRO to be created based on geographic item that is associated with a location 540 contained in an electronic file-of-reference 550, and that also has one or more location-associated geographic items contained in one or a plurality third-party files 594, 595. Although this figure depicts components as logically separate, such depiction is merely for illustrative purposes. It will be apparent to those skilled in the art that the components portrayed in this figure can be combined into a single component, or can be divided into further separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As shown in FIG. 7, the system 520 typically includes a computing device 524 which may comprise one or more memories 528, one or more processors 530, and one or more storages or repositories 532 of some sort. The system 520 may further include a display device 534, including a graphical user interface or GUI 536 operating thereon by which the system can display digital maps and other information. The device may under some other circumstances be text-based.

The system shown herein can be used to display the contents of the electronic document to an operator 538, or automatically to a computer process running on processor 530. Because the software for assigning ULROs will typically be proprietary, hard coding 544 can be used or embedded within the logic of the system to generate ULROs. When all or part of an electronic file-of-reference 550 is retrieved from external storage 553, (which in some instances may be the same storage as storage 532), ULROs and/or ULRCs will be created if they were not previously created (or alternatively will be fetched from a central repository 547 if they had been previously created) to correspond to a geographic item that is associated with a location 540 comprised in the electronic file-of-reference 550. The newly created, or retrieved ULRO is used to link the geographic item in the file-of-reference with location-associated information in the third-party files. In some cases side files comprising third-party pointers may also be used. As described above, a feature of the system 520 is its ability to facilitate links with locations and location associated geographic items in a wide variety of present and future document formats. Those ULROs can be created by various schemas. One such schema is to generate a ULRO whenever a need arises (such as request by a third-party based on its data needs). Another schema of generating ULROs is to preemptively create ULROs based on all addresses and location objects in the file-of-reference. Hybrid and other schema regimes are possible and conceivable.

Although shown as a single system in FIG. 7, several of the components can be distributed over a variety of different computer systems and processors. For example, in accordance with one embodiment, the user's computer can communicate 572, 574 with a remote server 570 on which all of the database, file-of-reference, third-party-files, and other components are located. However, in other embodiments, for example, the file-of-reference may be located on a different machine from the third-party files, while the ULRO repository exists on yet another machine. Indeed, it is a feature of the present system that the ULRO allows for information to be dynamically linked from a variety of different sources, including different vendors, even if those sources are widely distributed over a large area, or a large area network, such as the Internet.

Embodiments of the present invention may be conveniently implemented using a conventional general purpose or a specialized digital computer or microprocessor programmed according to the teachings of the present disclosure, as will be apparent to those skilled in the computer art. Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of embodiments of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), embodiments of the present invention include software for controlling both the hardware of the general purpose/specialized computer or microprocessor, and for enabling the computer or microprocessor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the programming (software) of the general/specialized computer or microprocessor are software modules for implementing the teachings of the present invention, including, but not limited to, creating a universal location referencing object (ULRO) corresponding to a selected location in an electronic file-of-reference, one or more location-associated geographic items also being comprised in one or more third-party files; determining a set of name information corresponding to a selected location; determining a super-set of coordinates corresponding to the location; assigning a universal location referencing code (ULRC) uniquely corresponding to the location; creating a file-of-reference pointer field comprising a file-of-reference pointer that designates the location in the file-of-reference; creating a third-party file pointer field comprising one or more third-party file pointers, wherein each third-party file pointer uniquely designates the one or more location-associated geographic item(s) in one of the one of more third-party files; creating a file-of-reference back-pointer field comprising a file-of-reference back-pointer pointing from said file-of-reference back to said ULRO resident in the file-of-reference or an associated side file; creating a third-party file back-pointer field comprising third-party file back-pointers resident in said third party file or an associated side file, wherein each said third-party file back pointer uniquely points from one location-associated geographic item of said third-party files back to said ULRO; creating a metadata field configured to comprise metadata relating to the ULRO; and combining the set of name information, the super-set of coordinates, the ULRC, the file-of-reference pointer field, the third-party file pointer field, the file-of-reference back-pointer field, the third-party file back-pointer field, and the metadata field so as to create the ULRO.

The foregoing description of the present invention has been provided for the purposes of illustration and description. It is not intended to be exhaustive or to limit embodiments of the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing geographic item information for a location, using universal location referencing objects, comprising the steps of:
   accessing a file-of-reference that comprises geographic item information, wherein the file-of-reference comprises geographic item information, including a geographic item associated with a location;
   accessing a third-party file, wherein the third-party file comprises additional geographic item information that can be associated with the location; and
   in response to a request for information for a particular location,
      retrieving a universal location reference object for the particular location, wherein the universal location reference object comprises a universal location reference code that uniquely identifies the particular location, and further comprises identifying information for the particular location,
      traversing links to the additional geographic item information in the third-party file,
      associating the geographic item information in the file-of-reference with the additional geographic item information in the third-party file, to create a resultant information, and
   providing the resultant information as a response to the request.

2. The method of claim 1, wherein the request is received from an operator.

3. The method of claim 1, wherein the request is received automatically from another system without the input of an operator.

4. The method of claim 1, wherein the universal location reference object is created only at the time of receiving the request.

5. The method of claim 1, wherein the method further determines which of a plurality of universal location reference objects in the system are associated with the same particular location.

6. The method of claim 1, wherein the method further comprises providing an application programming interface that allows software developers to create relationships between the file-of-reference and one or more third-party file.

7. The method of claim 1, wherein the method is incorporated into a cell phone or PDA-based navigation system.

8. The method of claim 1, wherein the method is used to provide a driving/traffic conditions update to an end user, operator, or system.

9. The method of claim 1, wherein the associating is performed by establishing a traversable link between the file-of-reference and a third-party file for the particular location.

10. The method of claim 1, wherein the file-of-reference and the third-party-file are one or more of a map, document, or database that contains geographic information for multiple locations.

11. A method of creating a data structure that uses universal location referencing objects to enable the providing of geographic item information for a location, comprising:
   storing in a data structure a pointer to a file-of-reference, wherein the file-of-reference comprises geographic item information, including a geographic item associated with a location;
   storing in the data structure a pointer to a third-party file, wherein the third-party file comprises additional geographic item information that can be associated with the location;
   storing in the data structure a universal location reference object, wherein the universal location reference object includes
      a universal location reference code that uniquely identifies the location,
      identifying information for the location, and
      links to the additional geographic item information in the third-party file; and
   using the combination of pointer to a file-of-reference, pointer to a third-party file, and universal location reference object, to allow a universal location reference object to be retrieved for a particular location, and the links traversed in that universal location reference object to associate the additional geographic item information in the third-party file with the geographic item information in the file-of-reference for that particular location.

* * * * *